United States Patent
Rybalchenko et al.

(10) Patent No.: US 10,824,627 B2
(45) Date of Patent: Nov. 3, 2020

(54) METHOD AND SYSTEM FOR DETERMINING RANK POSITIONS OF NON-NATIVE ITEMS BY A RANKING SYSTEM

(71) Applicant: YANDEX EUROPE AG, Lucerne (CH)

(72) Inventors: Roman Mikhailovich Rybalchenko, Novocherkassk (RU); Nikolay Alekseevich Matsuk, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 485 days.

(21) Appl. No.: 15/891,813

(22) Filed: Feb. 8, 2018

(65) Prior Publication Data
US 2019/0034432 A1 Jan. 31, 2019

(30) Foreign Application Priority Data
Jul. 25, 2017 (RU) .................. 2017126528

(51) Int. Cl.
| | | |
|---|---|---|
| G06F 16/00 | (2019.01) | |
| G06F 16/2457 | (2019.01) | |
| G06N 20/00 | (2019.01) | |
| G06F 16/9535 | (2019.01) | |
| G06N 5/02 | (2006.01) | |

(52) U.S. Cl.
CPC .... *G06F 16/24578* (2019.01); *G06F 16/9535* (2019.01); *G06N 5/02* (2013.01); *G06N 20/00* (2019.01)

(58) Field of Classification Search
CPC .......... G06F 16/24578; G06F 16/9535; G06Q 30/0269; G06Q 30/0631; G06N 5/02; G06N 5/04; G06N 20/00
See application file for complete search history.

(56) References Cited

U.S. PATENT DOCUMENTS

| | | |
|---|---|---|
| 7,548,936 B2 | 6/2009 | Liu et al. |
| 7,831,595 B2 | 11/2010 | Suresh et al. |
| 8,051,072 B2 | 11/2011 | Zheng et al. |

(Continued)

FOREIGN PATENT DOCUMENTS

WO 2016000251 A1 1/2016

*Primary Examiner* — Diedra McQuitery
(74) *Attorney, Agent, or Firm* — BCF LLP

(57) ABSTRACT

A method and server for determining rank positions of non-native items by a ranking system is provided. Native items are rankable by the ranking system and non-native items are non-rankable thereby. The method comprises acquiring user interactions associated with items. Each item is associated with a visual position on a SERP such that the native items and the non-native item are arranged in a visual 2-D arrangement having rows, each row has at least two horizontally-arranged items. The method comprises generating a usefulness score for each non-native item by analyzing user interactions associated with (i) the non-native item, (ii) items being horizontally-arranged after the non-native item and (iii) with items being vertically-arranged after the non-native item. The method comprises training the ranking system to predict a predicted usefulness score. The method also comprises determining an optimal ranked position for a non-native item by the ranking system during an in-use phase.

20 Claims, 7 Drawing Sheets

(56) References Cited

U.S. PATENT DOCUMENTS

| | | |
|---|---|---|
| 9,135,305 B2 | 9/2015 | Taubman et al. |
| 2010/0153370 A1* | 6/2010 | Gollapudi ............ G06F 16/958 |
| | | 707/722 |
| 2010/0312786 A1* | 12/2010 | Wai ...................... G06F 16/958 |
| | | 707/769 |
| 2011/0218946 A1 | 9/2011 | Stern et al. |
| 2011/0258149 A1* | 10/2011 | Kanungo ............ G06F 16/9558 |
| | | 706/12 |
| 2012/0271806 A1* | 10/2012 | Ieong ................. G06F 16/9535 |
| | | 707/706 |
| 2015/0142566 A1 | 5/2015 | Zhang et al. |
| 2015/0160793 A1 | 6/2015 | Plesur et al. |
| 2015/0169571 A1 | 6/2015 | Farago et al. |
| 2015/0169708 A1 | 6/2015 | Song et al. |
| 2015/0278358 A1* | 10/2015 | Abib ..................... G06N 20/00 |
| | | 707/706 |
| 2016/0055252 A1* | 2/2016 | Makeev ........... G06F 16/24578 |
| | | 707/733 |
| 2016/0217213 A1* | 7/2016 | Vorontcov ............ G06Q 30/02 |
| 2017/0075897 A1 | 3/2017 | Nikulin |
| 2017/0140053 A1* | 5/2017 | Vorobev ................ G06N 20/00 |

* cited by examiner

METHOD AND SYSTEM FOR DETERMINING RANK POSITIONS OF NON-NATIVE ITEMS BY A RANKING SYSTEM

CROSS-REFERENCE

The present application claims priority to Russian Patent Application No. 2017126528, entitled "Method and System for Determining Rank Positions of Non-Native Items by a Ranking System," filed Jul. 25, 2017, the entirety of which is incorporated herein by reference.

FIELD OF TECHNOLOGY

The present technology relates to item ranking and, more specifically, to methods and systems for determining rank positions of non-native items by a ranking system.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource he or she is interested in.

When the given user runs a search using the search engine, he or she generally has two priorities. He or she wants the search engine to locate the most relevant results and he or she wants the results relatively quickly. Search results are generally presented to the user on a webpage, such as a search engine results page (SERP). The SERP may contain any number of different types of results gathered from a variety of sources, such as general, textual search results from general internet searches, or particular types of search results (e.g., images and videos) retrieved from vertical searches. Search engines use a variety of methods to determine which search results are most relevant in response to a search query, and how to display such results to the user.

Usually, search engines are configured to take into account a plethora of factors, including indications of previous user interactions associated with search items, when ranking these search items amongst each other based on their relevance to queries. Thus, it can be said that search engines are well adapted to rank "old search items" that have been previously presented to users of the search engine and for which a considerable amount of previous user interactions has been collected.

Search engines are also configured to iteratively update a pool of search items that can be potentially presented to users thereof. This iterative updating of the pool of search items is generally known as "crawling", during which a crawling application is configured to access a plurality of web resources and to collect search items that can be potentially presented to users of the search engine in response to queries. As such, old search items are search items that have been crawled and have been often presented to users of a search engine such that a considerable amount of previous user interactions with these search items has been collected by the search engine. However, search items that have been crawled recently have not been often presented to users of the search engine and, therefore, only a limited amount of user interactions has been collected for these recently crawled items.

For the foregoing reasons, there is a need for new methods and systems for ranking recently crawled items.

SUMMARY

Developers of the present technology have appreciated that known search engines are ill-suited for ranking "fresh search items" which only recently became available to the search engine as potential search items to be presented to its users and for which only a limited amount of previous user interactions is available for ranking purposes. Despite the existence of ranking models for determining the selection and placement of search items on a SERP, improvements may still be made in methods and systems for ranking search items, to provide a more satisfactory search experience to the user.

Embodiments of the present technology have been developed based on developers' appreciation that while search engines are well adapted to rank "old search items" that are associated with previous user interactions (i.e., items that are native to the ranking system), these search engines are unable to effectively rank "fresh search items" that are associated with limited previous user interactions (i.e., items that are non-native to the ranking system) by conventional methods that employ user interactions for ranking purposes.

Embodiments of the present technology have been developed based on developers' appreciation of at least one technical problem associated with the prior art solutions. Therefore, developers have devised methods and systems for determining rank positions of non-native items by the ranking system. Moreover, developers have devised methods and systems that allow training a ranking system to predict usefulness scores of non-native items for various ranked positions and using the predicted usefulness scores for selecting a placement of the non-native items amongst native items on a given SERP. Additionally, developers have devised methods and systems that allow collecting data representative of user interactions associated with the non-native items without significantly deteriorating user satisfaction with search items presented to users of the search engine.

In a first broad aspect of the present technology, there is provided a method of determining rank positions of non-native items by a ranking system. The ranking system has been trained to rank native items based on previous user interactions associated with native items. The non-native items are associated with limited previous user interactions and are non-rankable by the ranking system. The method is executable on a server that implements the ranking system. The method comprises, during a training phase of the ranking system, acquiring, by the server, an indication of user interactions associated with a ranked list of items. Items of the ranked list of items have been visually displayed on a training search engine results page (SERP) to a user of a training device in response to a training query that has been received from the training device. The ranked list of items comprises native items and at least one non-native item. The native items have been ranked by the ranking system into a ranked list of native items. The at least one non-native item has been artificially inserted into the ranked list of native items at an artificially-selected position thereby forming the ranked list of items. Each item in the ranked list of items is associated with a respective visual position on the training SERP such that the native items and the at least one non-native item are arranged in a visual 2-D arrangement that has a plurality of vertically-arranged rows. The visual position of a given item is based on (i) the ranked list of items and (ii) SERP features of the training SERP. Each row of the visual 2-D arrangement comprises at least two horizontally-arranged items from the ranked list of items. The method comprises, during a training phase of the ranking system, generating, by the server, a respective usefulness score for each one of the at least one non-native item located at the respective visual position. The generating comprises, for a given one of the at least one non-native item: (i) analyzing, by the server, the user interactions associated with the given one of the at least one non-native item; (ii) analyzing, by the server, the user interactions associated with items that are horizontally-arranged after the given one of the at least one non-native item; and (iii) analyzing, by the server, the user interactions associated with items that are vertically-arranged after the given one of the at least one non-native item. The method comprises, during a training phase of the ranking system, training, by the server, the ranking system to predict a respective predicted usefulness score for an in-use non-native item for a respective rank position in a ranked list of in-use items in response to an in-use query. The ranking system is trained based on at least (i) the ranked list of items, (ii) the SERP features of the training SERP and (iii) the respective usefulness score of each one of the at least one non-native item. The method comprises, during an in-use phase of the ranking system, acquiring, by the server, the in-use query from an in-use device for visually displaying an in-use SERP associated with SERP features. The method comprises, during an in-use phase of the ranking system, generating, by the server, a ranked list of in-use native items in response to the in-use query. The method comprises, during an in-use phase of the ranking system, determining, by the server, an optimal rank position of the in-use non-native item in the ranked list of in-use items based on at least (i) the ranked list of in-use native items and (ii) the SERP features of the in-use SERP. The method comprises, during an in-use phase of the ranking system, inserting, by the server, the in-use non-native item in the ranked list of in-use native items at the optimal ranked position thereby forming the ranked list of in-use items.

In some implementations of the method, the method further comprises triggering a visual display of the in-use items of the ranked list of in-use items on the in-use SERP to a user of the in-use device.

In some implementations of the method, the server hosts a computer-executed service and the ranking system is implemented by the computer-executed service. The native items are used items that have been frequently used by users of the computer-executed service and the non-native items are fresh items that have been insufficiently used by the users of the computer-executed service and thus are non-rankable by a native ranking algorithm of the ranking system.

In some implementations of the method, a given item is one of: an image-type item and a video-type item.

In some implementations of the method, the at least one non-native item comprises one of: at least one non-native item randomly inserted in the ranked list of native items, and at least one non-native item inserted in the ranked list of native items according to a predetermined insertion pattern.

In some implementations of the method, the user interactions comprise at least one of:
a selection of a given item;
a long selection of the given item;
the selection of the given item followed by a web resource transition; and
a hovering action over the given item.

In some implementations of the method, the SERP features of a given SERP comprise:
query features associated with the respective query;
a window size of a browser application displaying the given SERP; and
a visual item size of each item in the respective ranked list of items.

In some implementations of the method, the query features of a given query comprise a recent submission frequency of the given query to the server as part of executing a search.

In some implementations of the method, the analyzing the user interactions associated with items that are horizontally-arranged after the given one of the at least one non-native item comprises analyzing, by the server, the user interactions associated with an immediately next horizontally-arranged item that is located immediately after the given one of the at least one non-native item.

In some implementations of the method, the at least one non-native item comprises a visual group of non-native items that includes at least two immediately horizontally-arranged non-native items. The given one of the at least one non-native item is one of the at least two immediately horizontally-arranged non-native items. The analyzing the user interactions associated with the given one of the at least one non-native item comprises analyzing, by the server, user interactions associated with each one of the at least two immediately horizontally-arranged non-native items. The analyzing the user interactions associated with items that are horizontally-arranged after the given one of the at least one non-native item comprises analyzing, by the server, the user interactions associated with N immediately next horizontally-arranged items after the at least two immediately horizontally-arranged non-native items of the visual group of non-native items. N is equal to a number of items amongst the at least two immediately horizontally-arranged non-native items of the visual group of non-native items. The analyzing the user interactions associated with items that are vertically-arranged after the given one of the at least one non-native item comprises analyzing, by the server, user interactions associated with items that are vertically-arranged after the at least two immediately horizontally-arranged non-native items of the visual group of non-native items.

In some embodiments of the method, the analyzing the user interactions associated with items that are vertically-arranged after the given one of the at least one non-native item comprises determining, by the server, a vertical proximity zone for the given one of the at least one non-native item based on the SERP features and analyzing, by the server, user interactions associated with items that are at least partially overlapped by the vertical proximity zone.

In some embodiments of the method, the vertical proximity zone is defined (i) in a following row located immediately below a current row of the given one of the at least one non-native item and (ii) between horizontal borders of the given one of the at least one non-native item. The analyzing the user interactions associated with items that are vertically-arranged after the given one of the at least one non-native item comprises analyzing, by the server, user interactions associated with any item located in the following row and at least partially overlapped by the vertical proximity zone.

In some embodiments of the method, the at least one non-native item comprises a visual group of non-native items that includes at least two immediately vertically-arranged non-native items located in immediately adjacent rows. The given one of the at least one non-native item is one of the at least two immediately vertically-arranged non-native items. The analyzing the user interactions associated with the given one of the at least one non-native item comprises analyzing, by the server, user interactions associated with each one of the at least two immediately vertically-arranged non-native items. The vertical proximity zone is defined (i) in N following rows located immediately below a lowest row of the immediately adjacent rows, and (ii) between horizontal borders of the visual group of non-native items. N is equal to a number of items amongst the at least two immediately vertically-arranged non-native items. The analyzing the user interactions associated with items that are vertically-arranged after the given one of the at least one non-native item comprises analyzing, by the server, user interactions associated with any item located in the N following rows and at least partially overlapped by the vertical proximity zone.

In some embodiments of the method, the user interactions associated with the given one of the at least one non-native item are indicative of positive user interactions with the given one of the at least one non-native items. The user interactions associated with items that are horizontally-arranged after the given one of the at least one non-native item and the user interactions associated with items that are vertically-arranged after the given one of the at least one non-native item are indicative of negative user interactions with the given one of the at least one non-native items.

In some embodiments of the method, the respective usefulness score is a weighted sum of the respective positive user interactions and of the respective negative user interactions.

In some embodiments of the method, the generating the respective usefulness score comprises applying a surplus function, where a win is determined by the respective positive user interactions and a loss is determined by the respective negative user interactions.

In some embodiments of the method, the SERP features of the training SERP comprise SERP-centric features of the training SERP and query features of the training query.

In some embodiments of the method, the SERP features of the in-use SERP comprise in-use SERP-centric features of the in-use SERP and query features of the in-use query.

In some embodiments of the method, the at least one non-native item comprises a visual group of non-native items including at least two immediately horizontally-arranged non-native items and at least two immediately vertically-arranged non-native items located in immediately adjacent rows. The given one of the at least one non-native item is one of the visual group of non-native items The analyzing the user interactions associated with the given one of the at least one non-native item comprises analyzing, by the server, user interactions associated with each one of the visual group of non-native items. The analyzing the user interactions associated with items that are horizontally-arranged after the given one of the at least one non-native item comprises analyzing, by the server, the user interactions associated with N immediately next horizontally-arranged items after the at least two immediately horizontally-arranged non-native items of the visual group of non-native items. N is equal to a number of items amongst the at least two immediately horizontally-arranged non-native items of the visual group of non-native items. The vertical proximity zone is defined (i) in M following rows located immediately below a lowest row of the immediately adjacent rows and (ii) between horizontal borders of the visual group of non-native items. M is equal to a number of items amongst the at least two immediately vertically-arranged non-native items The analyzing the user interactions associated with items that are vertically-arranged after the given one of the at least one non-native item comprises analyzing, by the server, user interactions with any item located in the M following rows and at least partially overlapped by the vertical proximity zone.

In another broad aspect of the present technology, there is provided a method of training a ranking system to predict a usefulness score of a non-native item for a respective rank position in a ranked list of items in response to a query. The ranking system has been trained to rank native items based on previous user interactions associated with native items. The non-native items are associated with limited previous user interactions and are non-rankable by the ranking system. The method is executable on a server that implements the ranking system. The method comprises acquiring an indication of user interactions associated with a ranked list of items. Items of the ranked list of items have been visually displayed on a training SERP to a user of a training device in response to a training query that has been received from the training device. The ranked list of items comprises native items and at least one non-native item. The native items have been ranked by the ranking system into a ranked list of native items. The at least one non-native item has been artificially inserted into the ranked list of native items at an artificially-selected position thereby forming the ranked list of items. Each item in the ranked list of items is associated with a respective visual position on the training SERP such that the native items and the at least one non-native item are arranged in a visual 2-D arrangement that has a plurality of vertically-arranged rows. The visual position of a given item is based on (i) the ranked list of items and (ii) SERP features of the training SERP. Each row of the visual 2-D arrangement comprises at least two horizontally-arranged items from the ranked list of items. The method comprises generating, by the server, a respective usefulness score for each one of the at least one non-native item located at the respective visual position. The generating comprises, for a given one of the at least one non-native item (i) analyzing, by the server, the user interactions associated with the given one of the at least one non-native item, (ii) analyzing, by the server, the user interactions associated with items that are horizontally-arranged after the given one of the at least one non-native item and (iii) analyzing, by the server, the user interactions associated with items that are vertically-arranged after the given one of the at least one non-native item. The method comprises training, by the server, the ranking system to predict the respective usefulness score for an in-use non-native item for a respective rank position in a ranked list of in-use items in response to an in-use query. The ranking system is trained based on at least (i) the ranked list of items, (ii) the SERP features of the training SERP and (iii) the respective usefulness score of each one of the at least one non-native item.

In another broad aspect of the present technology, there is provided a server for determining rank positions of non-native items by a ranking system. The ranking system has been trained to rank native items based on previous user interactions associated with native items. The non-native items are associated with limited previous user interactions and are non-rankable by the ranking system. The server implements the ranking system. The server is configured to, during a training phase of the ranking system, acquire an indication of user interactions associated with a ranked list of items. Items of the ranked list of items have been visually displayed on a training search engine results page (SERP) to a user of a training device in response to a training query that has been received from the training device. The ranked list of items comprises native items and at least one non-native item The native items have been ranked by the ranking system into a ranked list of native items. The at least one non-native item has been artificially inserted into the ranked list of native items at an artificially-selected position thereby forming the ranked list of items. Each item in the ranked list of items is associated with a respective visual position on the training SERP such that the native items and the at least one non-native item are arranged in a visual 2-D arrangement that has a plurality of vertically-arranged rows. The visual position of a given item is based on (i) the ranked list of items and (ii) SERP features of the training SERP. Each row of the visual 2-D arrangement comprises at least two horizontally-arranged items from the ranked list of items. The server is configured to, during a training phase of the ranking system, generate a respective usefulness score for each one of the at least one non-native item located at the respective visual position. The server configured to generate comprises the server configured to, for a given one of the at least one non-native item (i) analyze the user interactions associated with the given one of the at least one non-native item, (ii) analyze the user interactions associated with items that are horizontally-arranged after the given one of the at least one non-native item, and (iii) analyze the user interactions associated with items that are vertically-arranged after the given one of the at least one non-native item. The server is configured to, during a training phase of the ranking system, train the ranking system to predict a respective predicted usefulness score for an in-use non-native item for a respective rank position in a ranked list of in-use items in response to an in-use query. The ranking system is trained based on at least (i) the ranked list of items, (ii) the SERP features of the training SERP and (iii) the respective usefulness score of each one of the at least one non-native item. The server is configured to, during an in-use phase of the ranking system, acquire the in-use query from an in-use device for visually displaying an in-use SERP associated with SERP features. The server is configured to, during an in-use phase of the ranking system, generate a ranked list of in-use native items in response to the in-use query. The server is configured to, during an in-use phase of the ranking system, determine an optimal rank position of the in-use non-native item in the ranked list of in-use items based on at least (i) the ranked list of in-use native items and (ii) the SERP features of the in-use SERP. The server is configured to, during an in-use phase of the ranking system, insert the in-use non-native item in the ranked list of in-use native items at the optimal ranked position thereby forming the ranked list of in-use items.

In some embodiments of the server, the server is further configured to trigger a visual display of the in-use items of the ranked list of in-use items on the in-use SERP to a user of the in-use device.

In some embodiments of the server, the server hosts a computer-executed service and the ranking system is implemented by the computer-executed service. The native items are used items having been frequently used by users of the computer-executed service and the non-native items are fresh items having been insufficiently used by the users of the computer-executed service and thus are non-rankable by a native ranking algorithm of the ranking system.

In some embodiments of the server, a given item is one of: an image-type item and a video-type item.

In some embodiments of the server, the at least one non-native item comprises one of:
  at least one non-native item randomly inserted in the ranked list of native items; and
  at least one non-native item inserted in the ranked list of native items according to a predetermined insertion pattern.

25. The server of claim 20, wherein the user interactions comprise at least one of:
  a selection of a given item;
  a long selection of the given item;
  the selection of the given item followed by a web resource transition; and
  a hovering action over the given item.

In some embodiments of the server, the SERP features of a given SERP comprise:
  query features associated with the respective query;
  a window size of a browser application displaying the given SERP; and
  a visual item size of each item in the respective ranked list of items.

In some embodiments of the server, the query features of a given query comprise a recent submission frequency of the given query to the server as part of executing a search.

In some embodiments of the server, the server configured to analyze the user interactions associated with items that are horizontally-arranged after the given one of the at least one non-native item comprises the server that is configured to analyze the user interactions associated with an immediately next horizontally-arranged item located immediately after the given one of the at least one non-native item.

In some embodiments of the server, the at least one non-native item comprises a visual group of non-native items that includes at least two immediately horizontally-arranged non-native items. The given one of the at least one non-native item is one of the at least two immediately horizontally-arranged non-native items. The server is configured to analyze the user interactions associated with the given one of the at least one non-native item comprises the server configured to analyze user interactions associated with each one of the at least two immediately horizontally-arranged non-native items. The server configured to analyze the user interactions associated with items that are horizontally-arranged after the given one of the at least one non-native item comprises the server configured to analyze the user interactions associated with N immediately next horizontally-arranged items after the at least two immediately horizontally-arranged non-native items of the visual group of non-native items. N is equal to a number of items amongst the at least two immediately horizontally-arranged non-native items of the visual group of non-native items. The server configured to analyze the user interactions associated with items that are vertically-arranged after the given one of the at least one non-native item comprises the server configured to analyze user interactions associated with items that are vertically-arranged after the at least two immediately horizontally-arranged non-native items of the visual group of non-native items.

In some embodiments of the server, the server configured to analyze the user interactions associated with items that are vertically-arranged after the given one of the at least one non-native item comprises the server configured to determine a vertical proximity zone for the given one of the at least one non-native item based on the SERP features. The server configured to analyze user interactions associated with items that are at least partially overlapped by the vertical proximity zone.

In some embodiments of the server, the vertical proximity zone is defined (i) in a following row located immediately below a current row of the given one of the at least one non-native item, and (ii) between horizontal borders of the given one of the at least one non-native item. The server configured to analyze the user interactions associated with items that are vertically-arranged after the given one of the at least one non-native item comprises the server configured to analyze user interactions associated with any item located in the following row and at least partially overlapped by the vertical proximity zone.

In some embodiments of the server, the at least one non-native item comprises a visual group of non-native items that includes at least two immediately vertically-arranged non-native items located in immediately adjacent rows. The given one of the at least one non-native item is one of the at least two immediately vertically-arranged non-native items. The server is configured to analyze the user interactions associated with the given one of the at least one non-native item comprises the server configured to analyze user interactions associated with each one of the at least two immediately vertically-arranged non-native items. The vertical proximity zone is defined (i) in N following rows located immediately below a lowest row of the immediately adjacent rows and (ii) between horizontal borders of the visual group of non-native items. N is equal to a number of items amongst the at least two immediately vertically-arranged non-native items. The server configured to analyze the user interactions associated with items that are vertically-arranged after the given one of the at least one non-native item comprises the server configured to analyze user interactions associated with any item located in the N following rows and at least partially overlapped by the vertical proximity zone.

In some embodiments of the server, the user interactions associated with the given one of the at least one non-native item are indicative of positive user interactions with the given one of the at least one non-native items. The user interactions associated with items that are horizontally-arranged after the given one of the at least one non-native item and the user interactions associated with items that are vertically-arranged after the given one of the at least one non-native item are indicative of negative user interactions with the given one of the at least one non-native items.

In some embodiments of the server, the respective usefulness score is a weighted sum of the respective positive user interactions and of the respective negative user interactions.

In some embodiments of the server, the server configured to generate the respective usefulness score comprises the server configured to apply a surplus function, where a win is determined by the respective positive user interactions and a loss is determined by the respective negative user interactions.

In some embodiments of the server, the SERP features of the training SERP comprise SERP-centric features of the training SERP and query features of the training query.

In some embodiments of the server, the SERP features of the in-use SERP comprise in-use SERP-centric features of the in-use SERP and query features of the in-use query.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
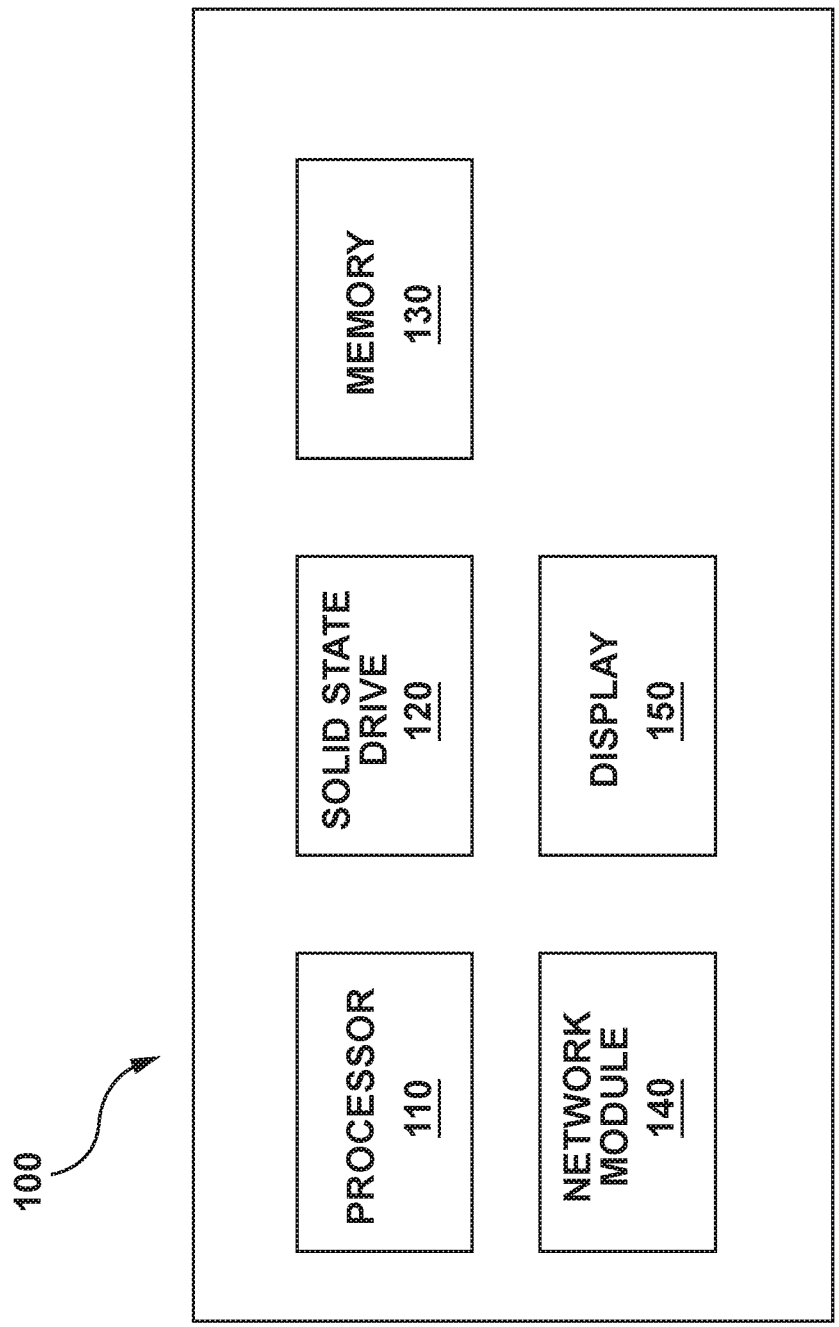
FIG. 1 depicts a schematic diagram of an example computer system for implementing non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory, a network module 140 and a display 150. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for displaying information to a user of the computer system 100 as will be described in further detail below. For example, the program instructions may be part of a browser application executable by the processor 110. The network module 140 allows communication between different computer systems, servers and/or other devices.

Figure 2:
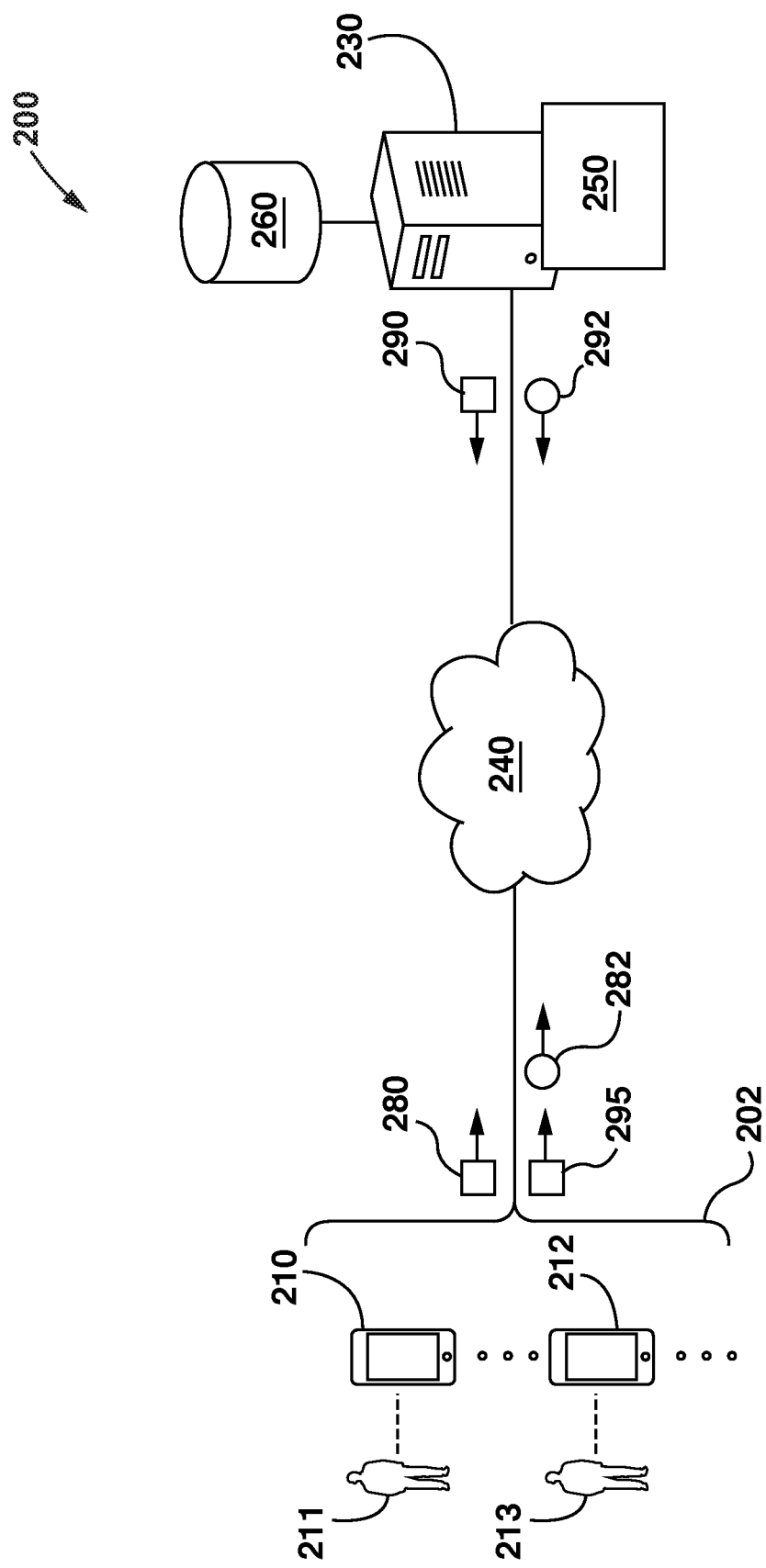
FIG. 2 depicts a networked computing environment being suitable for use with some implementations of the present technology.

FIG. 2 illustrates a networked computing environment 200 suitable for use with some embodiments of servers and/or methods of the present technology. The networked computing environment 200 comprises a plurality of electronic devices 202 and a server 230 which are communicatively coupled via a communications network 240. The plurality of electronic devices 202 comprises electronic devices 210 and 212 respectively associated with users 211 and 213. It should be noted that the plurality of electronic devices 202 may comprise a larger number of electronic devices such as 100, 1000, 10000, 1000000, and the like. It should be noted that the networked computing environment 200 may comprise other electronic devices such as, but not limited to, resource servers (not depicted) for providing web resources, without departing from the scope of the present technology. The resource servers have been omitted in FIG. 2 for the sake of simplicity only.

The implementation of a given electronic device from plurality of electronic devices 202 is not particularly limited, but as an example, the given electronic device may be implemented as a wireless communication device such as a mobile telephone (e.g. a smart phone or a radio-phone), a tablet, a personal computer and the like. However in FIG. 2, each given electronic device is depicted as the smart phone.

As previously mentioned, a given user is associated a respective electronic device. It should be noted that the fact that the given electronic device is associated with the respective user does not need to suggest or imply any mode of operation—such as a need to log in, a need to be registered or the like. In other words, the associations between the given user and the respective electronic device denote the assumption that the given user may interact with the respective electronic device.

The given electronic device may comprise some or all of the components of the computer system 100 depicted in FIG. 1. In some embodiments, the given electronic device comprises the network module 140 for communicating with the server 230 via the communications network 240, the processor 110, the memory 130 and the display 150 (such as a touch-screen, for example). The given electronic device comprises hardware and/or software and/or firmware, or a combination thereof, for executing a given browser application and communicating with the server 230 via the communications network 240.

Generally speaking, the purpose of a given browser application is to enable a given user to access one or more web resources via the communications network 240. How the browser application is implemented is not particularly limited. One example of the given browser application may be embodied as a Yandex™ browser.

In some embodiments of the present technology, the communications network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. How a communication link (not separately numbered) between a given navigational device and the communications network 240 is implemented will depend inter alia on how the given navigational device is implemented.

Merely as an example and not as a limitation, in those embodiments of the present technology where the given electronic device is implemented as a wireless communication device such as a smart phone, the communication link can be implemented as a wireless communication link. Examples of wireless communication links include, but are not limited to, a 3G communication network link, a 4G communication network link, and the like. The communications network 240 may also use a wireless connection with the server 230.

In some embodiments of the present technology, the server 230 is implemented as a conventional computer server. In one non-limiting example, the server 230 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 230 may be distributed and may be implemented via multiple servers.

In some embodiments of the present technology, the server 230 may host one or more computer-executed services such as a search engine, for example. In other words, the server 230 may be under control and/or management of a search engine provider (not depicted), such as, for example, an operator of the Yandex™ search engine. As such, the server 230 may be configured to execute one or more searches responsive to queries submitted thereto by users of the search engine. The server 230 may be configured to generate and send to any one of the plurality of electronic devices 202 a response data packet 290 and/or a response data packet 292 via the communications network 240. How the server 230 is configured to generate and send the response data packets 290 and 292 as well as the content of the response data packets 290 and 292 will be further described herein below.

There is also depicted a database 260 that is communicatively coupled to the server 230. Even though in the depicted embodiment the database 260 is coupled directly to the server 230 (such as via a private network), in alternative implementations, the database 260 may be communicatively coupled to the server 230 via the communications network 240 without departing from the teachings of the present technology.

Although the database 260 is illustrated schematically herein as a single entity, it is contemplated that the database 260 may be implemented in a distributed manner, for example, the database 260 could have different components, each component being configured for a particular kind of retrieval therefrom or storage therein. The database 260 may be a structured collection of data, irrespective of its particular structure or the computer hardware on which data is stored, implemented or otherwise rendered available for use. The database 260 may reside on the same hardware as a process that stores or makes use of the information stored in the database 260 or it may reside on separate hardware. Generally speaking, the database 260 may receive data from the server 230 for storage thereof and may provide stored data to the server 230 for use thereof.

The database 260 may store information associated with web-resource items that are available from a plurality of resources (i.e., the resource servers) and accessible via the communications network 240. The process of populating and maintaining the database 260 is generally known as "crawling". These web-resource items may be potentially presented to users of the search engine in response to queries submitted to the search engine. The process of crawling can be executed (and repeated) on a regular (and recurring) basis. Through the re-execution of the process of crawling, the database 260 is populated with an indication of new resources/web-resource items available via the communications network 240. For the sake of simplicity only, the web-resource items will be referred herein below simply as "items".

It is contemplated that items may be associated with, and classified in the database 260 by, their respective item types. For example, a given item may be an image-type item, a video-type item, a news-type item, a resource-type item and the like. In the present description, implementations of the present technology will be described with reference to items which are of an image-type, however, it shall be understood that other items associated with other item-types are contemplated in additional embodiments without departing from the scope of the present technology.

The database 260 may also store item-inherent characteristics associated with each item. Some item-inherent characteristics may be retrieved from the respective resources that host these items, while other item-inherent characteristics may be determined by the server 230. For example, the database 260 may store information related to:

item size of each item (e.g., visual size of items, when rendered on a computer screen);
color scheme of each item;
presence of an object in each item (e.g., determined via various computer vision techniques);
item-type of each item;
resource of each item; and
freshness parameter of each item (e.g., a value that is inversely proportional to elapsed time since each item has been crawled).

However, it should be noted that other or additional item-inherent characteristics associated with items are contemplated in other embodiments without departing from the scope of the present technology.

In addition to storing information associated with items, the database 260 is configured to store indications of user interactions respectively associated with each item. The user interactions associated with a given item that are stored in the database 260 are previous user interactions that users of the search engine performed with respect to the given item as part of their interactions with the search engine result page that included the given item. A non-exhaustive list of various user interactions that a user can execute in association with a given item is:

a selection of the given item (e.g., a "click" on the given item);
a long selection of the given item (e.g., a long "click" on the given item);
the selection of the given item followed by a web resource transition (e.g., a click on the given item followed by a redirection to the resource of the given item); and
a hovering action over the given item (e.g., cursor hovering time over the given item).

However, it should be noted that indications of other user interactions may be stored in the database 260 in association with items in other embodiments without departing from the scope of the present technology.

It should be understood that some items stored in the database 260 are associated with less user interactions than others. In other words, some items that are stored in the database 260 are associated with limited user interactions. For example, some items may be used items that have been frequently used by users of the search engine and, therefore, are associated with a considerable amount of user interactions, while other items may be fresh items that are associated with a limited amount of user interactions since they have been "crawled" only recently and have been rarely presented to the users or not presented at all.

The database 260 may also be configured to store information regarding a plurality of queries submitted to the search engine by various users thereof. This means that the database 260 may be configured to store query features associated with queries submitted to the search engine. The query features may comprise statistical information regarding query submissions such as, for example, a recent submission frequency of any given query to the search engine of the server 230. A recent submission frequency of a given query may correspond to a total number of submissions of the given query, for example, in the last twenty-four (24) hours. Other statistical information regarding query submissions may be stored in the database 260 without departing from the scope of the present technology.

In some embodiments of the present technology, the server 230 also implements a ranking system 250 for selecting generally-relevant items and ranking them in response to queries submitted thereto by users of the search engine. Generally speaking, a given ranking system is configured to select items that are generally-relevant to a given query and to gather indications of user interactions associated with these items for further ranking based on their relevancy to the given query. In other words, the given ranking system may comprise a given user-interaction-based ranking algorithm that is configured to rank items based on user interactions associated therewith.

As has been alluded to above, some ranking systems are not suited to rank all items that are generally-relevant to a given query since some items that might be generally-relevant to the given query may be associated with limited user interactions. Indeed, ranking systems implementing user-interaction-based ranking algorithms are well suited for ranking used items that have been frequently used by users of the search engine since they are associated with a considerable amount of user interactions. These used items that are associated with a considerable amount of user interactions will be referred herein as "native items" since they are "rankable" by user-interaction-based ranking algorithms and, therefore, are "native" to the user-interaction-based ranking algorithms.

However, some ranking systems are not well suited for ranking fresh items since they are associated with a limited amount of user interactions. These fresh items will be referred herein as "non-native items" since they are "non-rankable" by user-interaction-based ranking algorithms since they have been insufficiently used by users of the search engine in order to be rankable by the user-interaction-based ranking algorithms and, therefore, are "non-native" to the user-interaction-based ranking algorithms.

In some embodiment of the present technology, the server 230 is configured to rank both native items and non-native items amongst each other using non-limiting embodiments of the present technology disclosed herein. The server 230 comprises hardware and/or software and/or firmware, or a combination thereof, for training the ranking system 250 to predict usefulness scores of non-native items. The server 230 also comprises hardware and/or software and/or firmware, or a combination thereof, for determining rank positions of non-native items using the predicted usefulness score. What usefulness scores are, how the server 230 is configured to train the ranking system 250 to predict these usefulness scores and how the server 230 is configured to determine rank positions of non-native items will be further described herein below.

Figure 3:
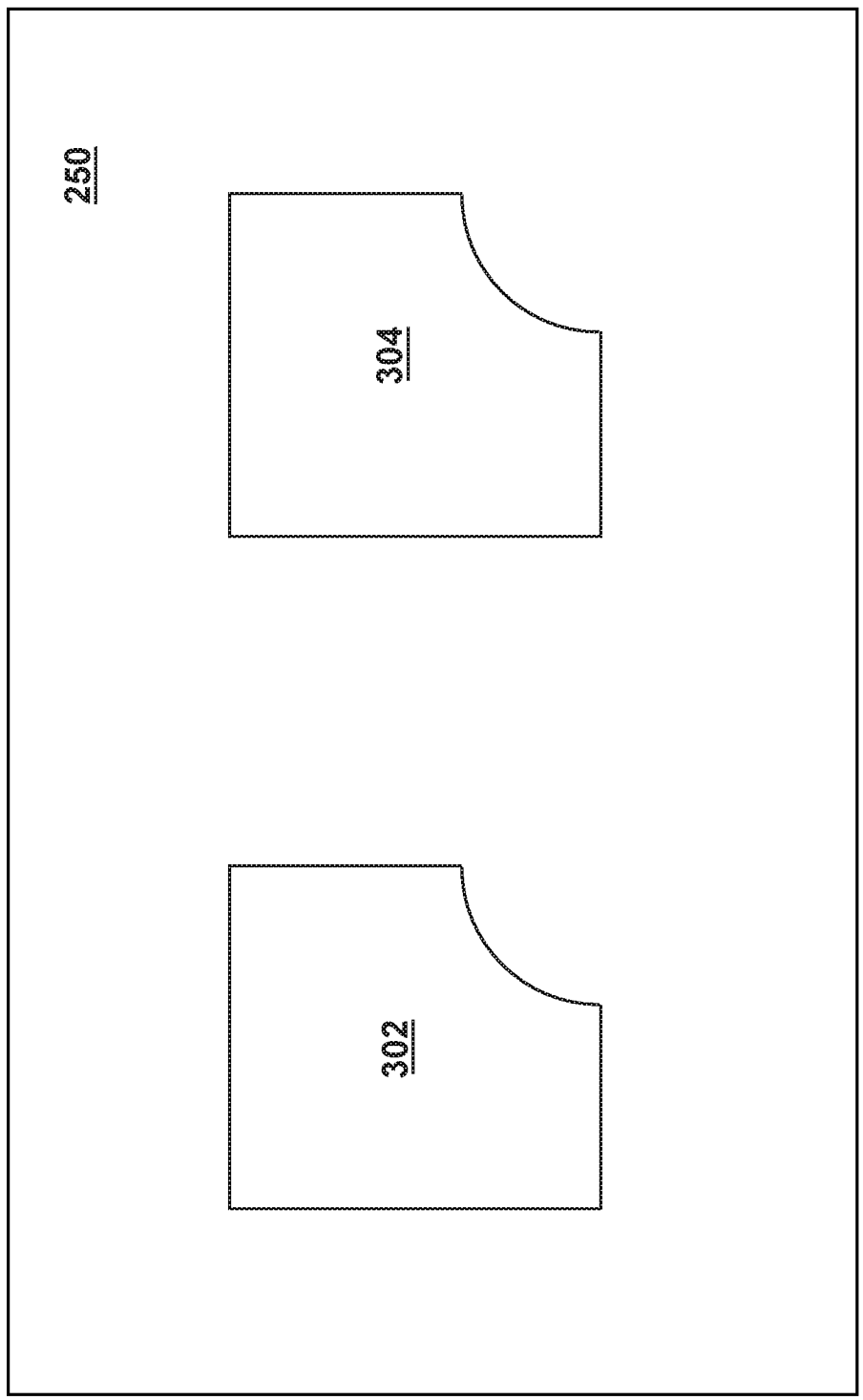
FIG. 3 depicts a schematic representation of a non-limiting embodiment of a ranking system executed by a server of the networked computing environment of FIG. 2.

With reference to FIG. 3, there is depicted the ranking system 250 of the server 230. The ranking system 250 is configured to execute two ranking algorithms: a user-interaction-based ranking algorithm 302 and a usefulness-score-prediction algorithm 304.

As previously mentioned, the user-interaction-based ranking algorithm 302 is trained to rank native items based on the user interactions associated therewith. For example, the user-interaction-based ranking algorithm 302 may be a machine learning algorithm (MLA) that has been trained on human labelled query-item pairs in order to predict relevancy scores of native items, based on, amongst other things, the previous user interactions associated therewith, for a given query. It can be said that the user-interaction-based ranking algorithm 302 was trained to, in a sense, learn hidden relationships or data patterns in the previous user interactions that are indicative of the relevance of a given native item to a given query. The user-interaction-based ranking algorithm 302 is not particularly limiting and can be trained via various techniques. Suffice it to state that the user-interaction-based ranking algorithm 302 has been trained to rank native items based on, amongst other things, the respective previous user interactions with items presented to past users in response to submitting a similar search query.

The usefulness-score-prediction algorithm 304 may be trained to predict usefulness scores of non-native items for various rank positions in a ranked list of items in response to a query. The usefulness-score-prediction algorithm 304 may also be implemented as an MLA as it will be further described below. How the usefulness-score-prediction algorithm 304 is trained to predict usefulness scores of non-native items will now be described with reference to FIGS. 2, 3, 4 and 5. It should be recalled that for the purposes of the description presented herein, an example of the items being image-type items will be used.

Let it be assumed that the user 211 interacts with the electronic device 210 which, in response to the user interaction with the electronic device 210, executes the browser application. The user 211 may then use the browser application in order to submit a given query to the search engine of the server 230. For example, let it be assumed that the user 211 enters the query "Explosion in metro" into the browser application. In response, the electronic device 210 may be configured to generate a submission data packet 280. The submission data packet 280 may comprise information indicative of the query "Explosion in metro" and may be sent to the server 230 via the communications network 240 thereby submitting the query "Explosion in metro" to the search engine.

Upon receiving the submission data packet 280, the server 230 may transmit the information indicative of the query "Explosion in metro" to the ranking system 250 for further processing. The ranking system 250 may access the database 260 in order to retrieve generally-relevant items to the query "Explosion in metro". The ranking system 250 may determine that a given item is generally-relevant to a given query based on various factors. For example, the ranking system 250 may:

analyze textual information, such as description or file name, associated with each item in the database 260 for textual string similarity to the given query;

number of duplicates of each item in the database 260;

analyze a uniform resource locator (URL) associated with a source resource for each item in the database 260 for textual string similarity to the given query;

analyze information gathered via computer vision techniques in association with each item in the database 260; and analyze any other item-inherent characteristic of each item.

It should be noted that the way the ranking system 250 may determine that a given item is generally-relevant to a given query is not particularly limiting and the ranking system 250 may make such a determination based on alternative or additional factors to those listed above. Suffice it to state that generally-relevant items are a subset of all the items stored in the database 260 and which are determined, based on several factors, to be at least remotely relevant to a given query submitted to the search engine.

Let it be assumed that the ranking system 250 selected thirty-six (36) items amongst the items stored in the database 260 based on their general-relevance to the query submitted by the user 211. It should be noted that in other implementations of the present technology, the ranking system 250 may select a different total number of items than thirty-six items based on the general-relevance to the query, without departing from the scope of the present technology. The ranking system 250 is also configured to retrieve user interactions associated with each one of the so-selected generally-relevant items.

After retrieving the user interactions for the thirty-six items, the ranking system 250 may determine that six items amongst the thirty-six items are associated with limited user interactions or with no user interactions at all.

The ranking system 250 may also be configured to analyze a recent submission frequency of the query "Explosion in metro". In other words, the ranking system 250 may be configured to determine whether the query "Explosion in metro" has been frequently submitted recently or, alternatively, has been rarely submitted recently to the search engine based on the statistical information regarding query submissions stored in the database 260. If the ranking system 250 determines that the query "Explosion in metro" has been frequently submitted recently to the search engine, the ranking system 250 may determine that the user 211 may be interested of viewing at least some fresh items that have been recently crawled. Indeed, the query "Explosion in metro" may be associated with a recently occurred event and, therefore, the user 211 is likely to be searching for fresh items.

Therefore, the ranking system 250 may be configured to process the six items (i.e., that are associated with limited user interactions or with no user interactions at all) as six non-native items to the user-interaction-based ranking algorithm 302 and the other thirty items, which are associated with user interactions, as native items to the user-interaction-based ranking algorithm 302.

Figure 4:
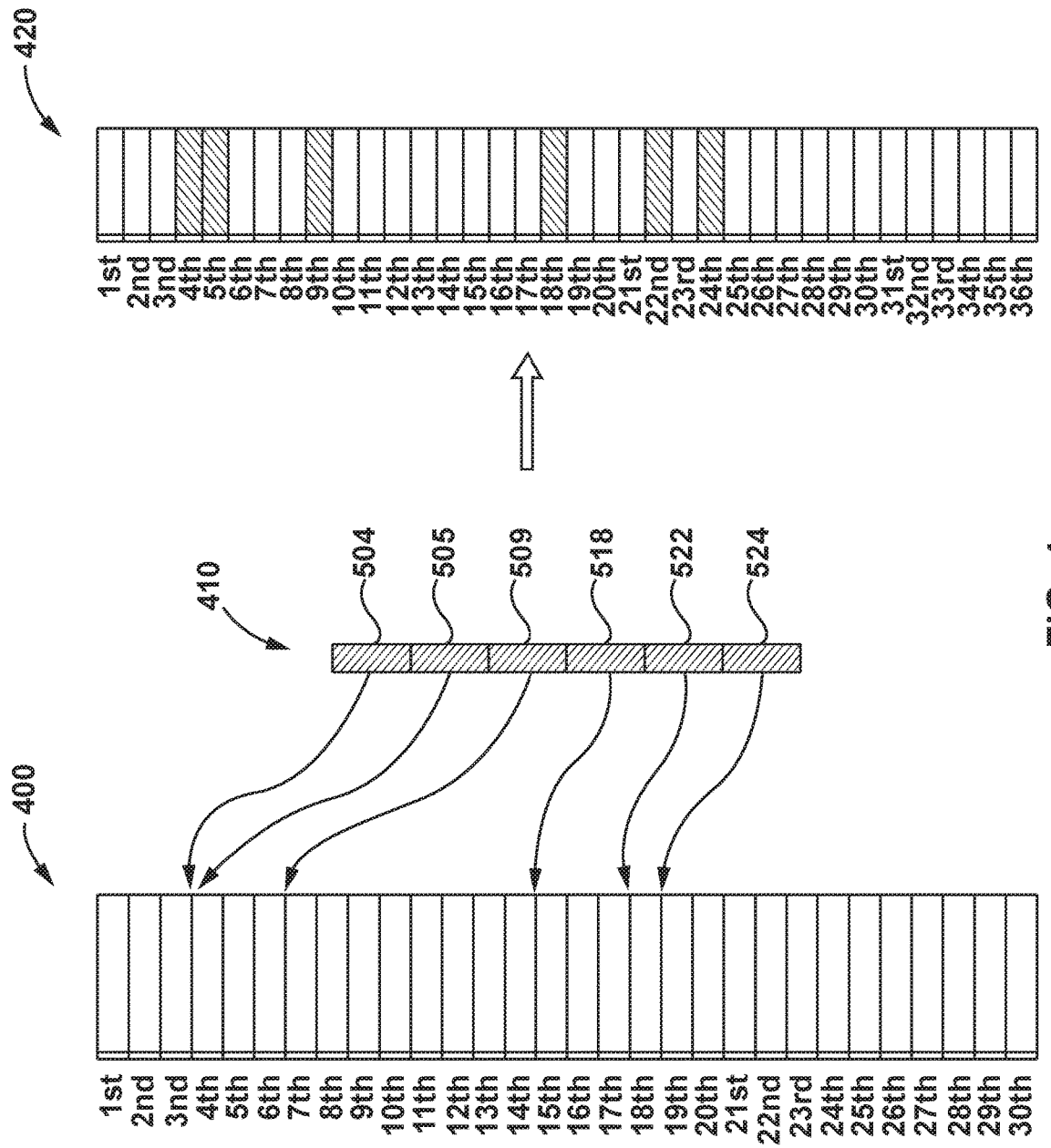
FIG. 4 depicts a ranked list of items formed by the ranking system of FIG. 3 for implementing certain embodiments of systems and/or methods of the present technology.

On the one hand, the ranking system 250 may be configured to input the query submitted by the user 211, the thirty native items and their respective user interactions in the user-interaction-based ranking algorithm 302 for ranking the thirty native items based on their relevance to the query submitted by the user 211. With reference to FIG. 4, there is depicted a ranked list of native items 400, generated by the user-interaction-based ranking algorithm 302, which comprises all thirty native items inputted therein.

On the other hand, the ranking system 250 does not input a plurality of non-native items 410, which include the six non-native items, namely non-native items 504, 505, 509, 518, 522 and 524 depicted in FIG. 4, into the user-interaction-based ranking algorithm 302 since, as previously explained, they are non-rankable by the user-interaction-based ranking algorithm 302 due to the insufficiency of user interactions associated therewith.

As a result, the ranking system 250 may perform an artificial merging procedure in order to consolidate both the thirty native items in the ranked list of native items 400 and a plurality of non-native items 410 into a ranked list of items 420. During the artificial merging procedure, the ranking system 250 may be configured to artificially insert into the ranked list of native items 400 each one of the plurality of non-native items 410 at an artificially-selected position thereby forming the ranked list of items 420. For ease of illustration, during the artificial merging procedure, the ranking system 250 may insert:

the non-native item 504 at an artificially-selected position between the third and the fourth native items in the ranked list of native items 400, which results in the non-native item 504 being associated with the fourth ranked position in the ranked list of items 420;

the non-native item 505 at the artificially-selected position also between the third and the fourth native items in the ranked list of native items 400 but after the non native item 504, which results in the non-native item 505 being associated with the fifth ranked position in the ranked list of items 420;

the non-native item 509 at an artificially-selected position between the sixth and the seventh native items in the ranked list of native items 400, which results in the non-native item 509 being associated with the ninth ranked position in the ranked list of items 420;

the non-native item 518 at an artificially-selected position between the fourteenth and the fifteenth native items in the ranked list of native items 400, which results in the non-native item 518 being associated with the eighteenth ranked position in the ranked list of items 420;

the non-native item 522 at an artificially-selected position between the seventeenth and the eighteenth native items in the ranked list of native items 400, which results in the non-native item 522 being associated with the twenty-second ranked position in the ranked list of items 420; and the non-native item 524 at an artificially-selected position between the eighteenth and the nineteenth native items in the ranked list of native items 400, which results in the non-native item 524 being associated with the twenty-fourth ranked position in the ranked list of items 420.

It is contemplated that in some embodiments of the present technology, during the artificial merging procedure, the ranking system 250 may randomly insert each one of the plurality of non-native items 410 at the artificially-selected positions being randomly-selected positions in the ranked list of native items 400 in order to form the ranked list of items 420. In other embodiments, during the artificial merging procedure, the ranking system 250 may insert each one of the plurality of non-native items 410 according to a predetermined insertion pattern, such as following a predetermined distribution for example, in the ranked list of native items 400 in order to form the ranked list of items 420. The predetermined distribution may be determined by the operator of the search engine and will depend on inter alia specific implementations of the present technology.

Additionally, the server 230 may be configured to store the ranked list of items 420 in the database 260 in association with the user 211 and/or the electronic device 210 and/or a current browsing session of the user 211 for further processing thereof in response to the completion of the artificial merging procedure.

The server 230 is also configured to generate the response data packet 290 comprising information indicative of the ranked list of items 420 and triggering information. The server 230 may send the response data packet 290 to the electronic device 210 via the communications network 240. The response data packet 290 comprises the triggering information for triggering the browser application to display to the user 211 via the display 150 of the electronic device 210 a training SERP 500 depicted in FIG. 5.

It shall be noted that the training SERP 500 is displayed in a window 550 of the browser application having a window size. The window size of the window 550 may be based on a size of the display 150 of the electronic device 210 or otherwise selected by the user 211. In this implementation, the window size of the window 550 is representative of an area having a width that spans between dots enumerated at 560 and 562.

Figure 5:
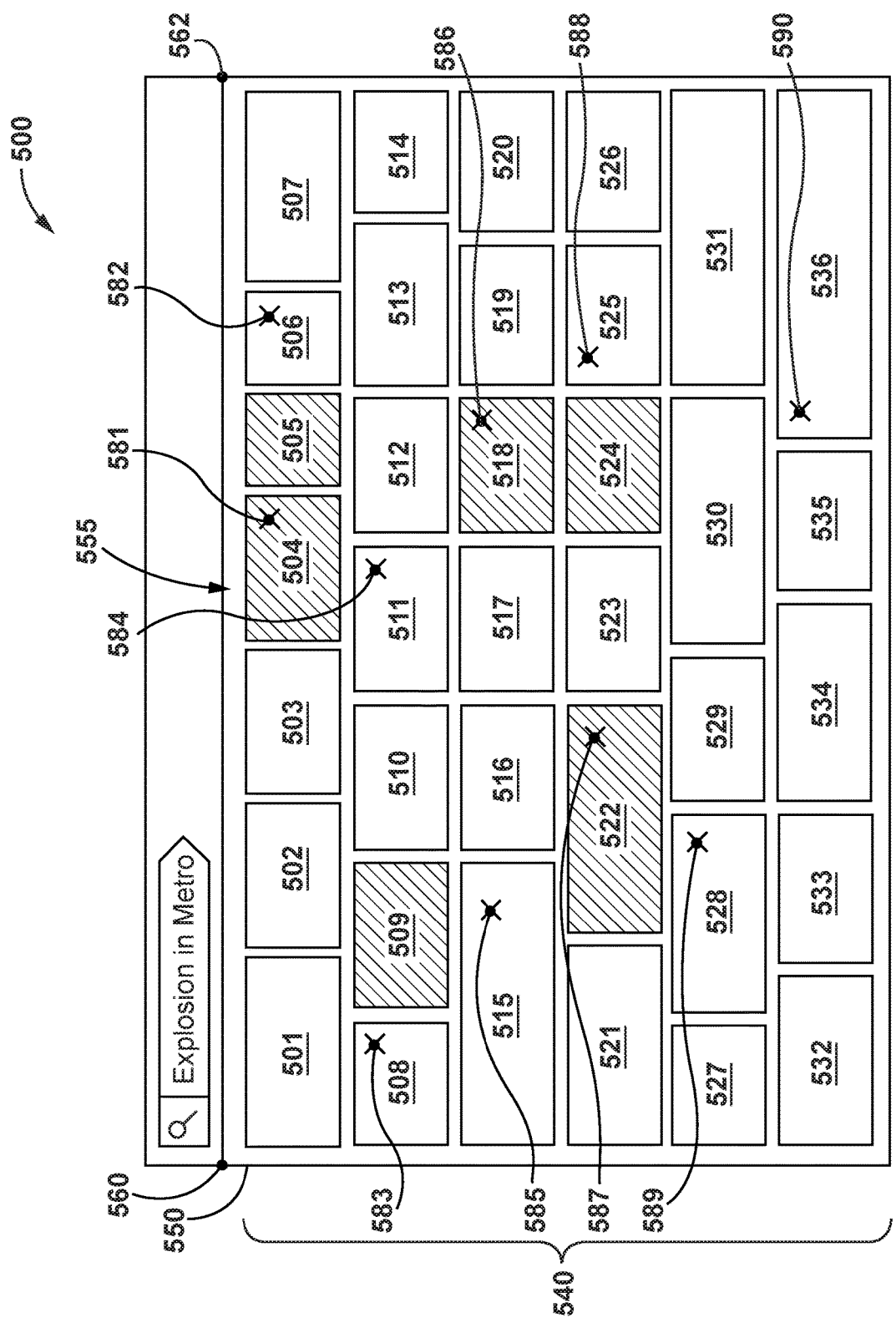
FIG. 5 depicts a training SERP presented to a user of an electronic device of FIG. 2 in a window of a browser application according to some embodiments of the present technology.

Each item of the ranked list of items 420 is associated with a respective visual position on the training SERP 500 such that each item of the ranked list of items 420 is arranged in a visual 2-D arrangement 555 having a plurality of vertically-arranged rows 540. The native items, namely native items 501, 502, 503, 506, 507, 508, 510, 511, 512, 513, 514, 515, 516, 517, 519, 520, 521, 523, 525, 526, 527, 528, 529, 530, 531, 532, 533, 534, 535 and 536 (i.e., the thirty native items), and the non-native items 504, 505, 509, 518, 522 and 524 (i.e., the six non-native items) which are shaded in FIG. 5, are arranged in the visual 2-D arrangement 555 based on (i) their respective ranks in the ranked list of items 420, (ii) their respective item sizes and (iii) the window size of the window 550. How each item of the ranked list of items 420 is arranged in the visual 2-D arrangement 555 will now be described.

For example, the most highly ranked item in the ranked list of items 420 is the native item 501 which is arranged as a first item in a first row of the visual 2-D arrangement 555. The second most highly ranked item in the ranked list of items 420 is the native item 502 which is arranged as a second item in the first row of the visual 2-D arrangement 555. Therefore, items are horizontally-arranged in each row according to their respective ranks in the ranked list of items 420, where the most relevant item in a given row is visually positioned as the first item in that row and the less relevant item in the given row is visually positioned as the last item in that row. As such, it can be said that items are arranged from left to right in each row according to a decreasing order of relevance with respect to the query. Naturally, items can be arranged from right to left in accordance with the decreasing order of relevancy.

It should be noted that the visual 2-D arrangement 555 can be said to be "justified". In other words, the first items in each one of the plurality of vertically-arranged rows 540 are aligned according to their leftmost border and the last items in each one of the plurality of vertically-arranged rows 540 are aligned according to their rightmost border. This inherent characteristic of the visual 2-D arrangement 555 drives, in combination with respective item sizes of items and the window size of the window 550, the selection of a number of items to be horizontally-arranged in each row.

For example, the native item 508 is ranked right after the native item 507 in the ranked list of items 420; however, due to the inherent characteristic of the visual 2-D arrangement 555 which has to be justified, due to the window size of the window 550 and due to the item sizes of items in the first row, the native item 508 does not fit in the first row. Therefore, the native item 508 is visually positioned as the first item in a second row amongst the plurality of vertically-arranged rows 540. As such, it can be said that items are arranged into different rows from top to bottom according to a decreasing order of relevance with respect to the query.

Now that the training SERP 500 is displayed to the user 211 on the display 150 of the electronic device 210, the user 211 may interact with items arranged in the visual 2-D arrangement 555. In the present description, user interactions associated with items arranged in the visual 2-D arrangement 555 will be described as item selections, such as item "clicks". However, other types of user interactions are contemplated in other embodiments of the present technology without departing from the scope of the present technology.

Let it be assumed that, while interacting with the training SERP 500, the user 211 clicked on:
  the non-native item 504;
  the native item 506;
  the native item 508;
  the native item 511;
  the native item 515;
  the non-native item 518;
  the non-native item 522;
  the native item 525;
  the native item 528; and
  the native item 536.

It should be noted that the above-mentioned clicks by the user 211 may or may not be performed by the user 211 in the specific order in which they are listed in the above-mentioned list. Also each one of the above-mentioned clicks is graphically depicted in FIG. 5 by respective click-markers 581, 582, 583, 584, 585, 586, 587, 588, 589 and 590. It should be noted that a precise location of the click on a given item is irrelevant, or in other words, a precise location of a given click-marker with respect to a respective item has been depicted arbitrarily and is irrelevant. Irrespective of the precise location on a given item where the user 211 clicked, an association of each click-marker with a respective item solely denotes the assumption that each respective item has been clicked by the user 211.

When the user 211 stops interacting all together with the training SERP 500 (e.g., terminates a browsing session), the browser application may be configured to instruct the electronic device 210 to generate a SERP data packet 295 (FIG. 2). After generating the SERP data packet 295, the electronic device 210 may send it to the server 230 for further processing.

The SERP data packet 295 may comprise information regarding SERP features of the training SERP 500. The SERP features of the training SERP 500 may comprise SERP-centric features and at least some query features of the query "Explosion in metro". The SERP-centric features associated with the training SERP may comprise, for example, the window size of the window 550 of the browser application displaying the training SERP 500 and the item size of each item displayed in the training SERP 500.

Thus, it can be said that the SERP data packet 295 comprises sufficient information to establish visual-positioning relationships between items in the ranked list of items 420 as if they were displayed to the user 211 in the training SERP 500 in the window 550 of the browser application of the electronic device 210. In other words, the SERP data packet 295 comprises information that is indicative of the respective visual position of each item with respect to each other as arranged in the visual 2-D arrangement 555 and as displayed in the window 550 of the browser application of the electronic device 210.

The SERP data packet 295 also comprises indications of user interactions with the training SERP 500. For example, the SERP data packet 295 may comprise information regarding clicks associated with respective click-markers 581, 582, 583, 584, 585, 586, 587, 588, 589 and 590. Additionally, the SERP data packet 295 may comprise information regarding other user interactions performed by the user 211 other than item selections without departing from the scope of the present technology.

The server 230 may acquire the SERP data packet 295 and may store the information that is acquired via the SERP data packet 295 in the database 260 for further processing. During the training phase of the ranking system 250, the server 230 may be configured to generate a respective usefulness score for each one of the non-native items 504, 505, 509, 518, 522 and 524 located at their respective visual positions as arranged in the visual 2-D arrangement 555. How the server 230 is configured to generate a respective usefulness score for a respective non-native item located at a respective visual position will now be described.

Broadly speaking, during the generation of a respective usefulness score for a given non-native item located at a respective visual position, the server 230 is configured to (i) analyze the user interactions associated with the given non-native item; (ii) analyze the user interactions associated with items being horizontally-arranged after the given non-native item; and (iii) analyze the user interactions associated with items being vertically-arranged after the given non-native item.

The present technology revolves around the assumption that user interactions with a given non-native item at a respective visual position are suggestive of the fact that the given non-native item has been appropriately visually positioned on the training SERP 500. Therefore, the user interactions associated with the given non-native are considered to be indicative of positive user interactions with that given non-native item.

The present technology also revolves around the assumption that user interactions with items being horizontally-arranged after the given non-native item and/or with items being vertically-arranged after the given non-native item are suggestive of the fact that the given non-native item has not been appropriately visually positioned on the training SERP 500. Therefore, the user interactions associated with the items being horizontally-arranged after the given non-native item and/or with the items being vertically-arranged after the given non-native item are considered to be indicative of negative user interactions with that given non-native item.

The server 230 may be configured to generate the respective usefulness score for the given non-native item being located at the given visual position according to a surplus function which takes into account both positive and negative user interactions with a given non-native item, such as:

$$\text{Surplus}(\text{win},\text{loss}) = a*\text{win} + b*\text{loss} \quad (1)$$

where a win is determined by respective positive user interactions and a loss is determined by the respective negative user interactions. It should be noted that a weight coefficient b may be of an opposite sign to a weight coefficient a. Therefore, it can be said that the server 230 may generate a respective usefulness score for a given non-native item being located at a given visual position based on a weighted sum of the respective positive user interactions and of the respective negative user interactions. The weight coefficients a and b may be determined by the operator of the search engine and will depend on inter alia specific implementations of the present technology. For example, in one implementation of the present technology, the weight coefficient a may correspond to a value of "1" while the weight coefficient b may correspond to a value of "−1.4".

Figure 6:
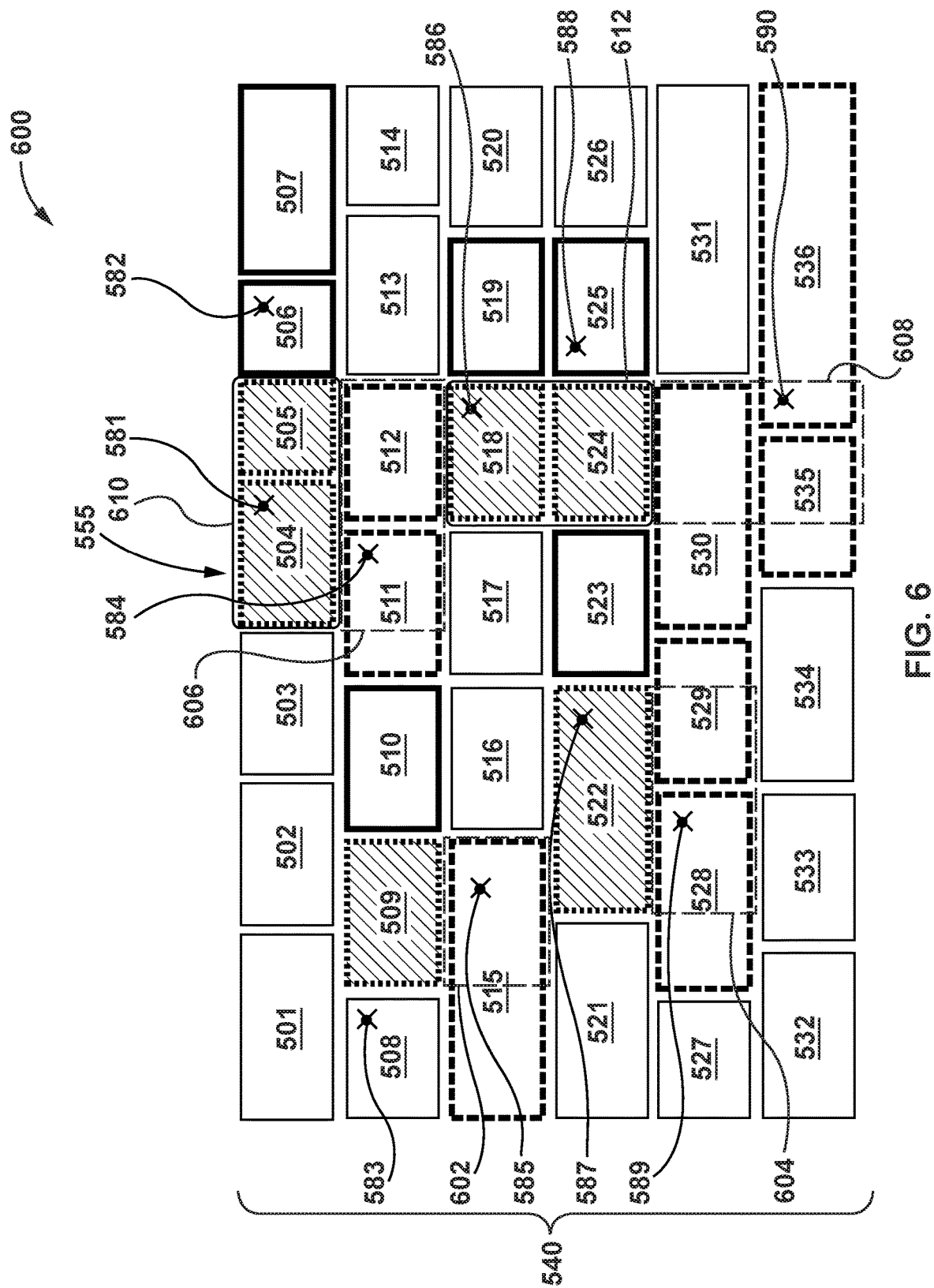
FIG. 6 is a schematic illustration of a non-limiting embodiment of an implementation of a routine executed by the server of FIG. 1 as part of processing user interactions associated with the training SERP of FIG. 5.

How the server 230 is configured to analyze (i) the user interactions associated with the given non-native item, (ii) the user interactions associated with items being horizontally-arranged after the given non-native item and (iii) the user interactions associated with items being vertically-arranged after the given non-native item in order to (a) determine both positive and negative user interactions associated with the given non-native item and, in turn, in order to (b) generate the respective usefulness score for the given non-native item located at a respective visual position will now be described with reference to FIG. 6.

FIG. 6 depicts a visual illustration 600 of a usefulness-score-generation routine executed by the server 230 as part of processing user interactions associated with the training SERP 500 in order to (a) determine both positive and negative user interactions associated with each non-native item and (b) generate the respective usefulness score for each non-native item located at a respective visual position.

The server 230 is able to execute the usefulness-score-generation routine as visually illustrated in FIG. 6 since the server 230 acquired the SERP data packet 295 which includes information that is indicative of the respective visual position of each item with respect to each other as arranged in the visual 2-D arrangement 555 and as displayed in the window 550 of the browser application of the electronic device 210.

It should be expressly understood, however, that the visual illustration 600 is depicted in FIG. 6 for illustration purposes only and that the server 230 is not required to per se generate the visual illustration 600 but, instead, is configured to execute the usefulness-score-generation routine according to what is visually illustrated in FIG. 6.

For explanation purposes only, all non-native items depicted in FIG. 6 are shaded and are contoured by finely-dotted lines. All items that are horizontally-arranged after a given non-native item are contoured by bolded lines. All items that are vertically-arranged after a given non-native item are contoured by thickly-dotted lines. How the identification of items that are horizontally-arranged after a given non-native item and the identification of items that are vertically-arranged after a given non-native item are executed by the server 230 for each given non-native item will be described with reference to several following examples.

Usefulness Score of the Non-Native Item 509

In a first example, an illustration of how the server 230 determines the usefulness score of the non-native item 509 will be described. The server 230 may be configured to analyze (i) the user interactions associated with the non-native item 509, (ii) the user interactions associated with items being horizontally-arranged after the non-native item 509, and (iii) the user interactions associated with items being vertically-arranged after the non-native item 509 in order to (a) determine both positive and negative user interactions associated with the non-native item 509 and, in turn, in order to (b) generate the respective usefulness score for the non-native item 509 located at its respective visual position. It should be noted that in this example the non-native item 509 is not visually positioned (vertically nor horizontally) next to any other non-native item.

During the analysis of the user interactions associated with the non-native item 509, the server 230 may be configured to verify whether the user 211 interacted with, or in this case clicked on, the non-native item 509. As a result of the analysis of the user interactions associated with the non-native item 509 and recalling the user interactions performed by the user 211 on the training SERP 500, the server 230 determines that the user 211 did not interact with the non-native item 509 and, therefore, the non-native item 509 is not associated with any positive user interactions.

During the analysis of the user interactions associated with items being horizontally-arranged after the non-native item 509, the server 230 may be configured to analyze the user interactions associated with an immediately next horizontally-arranged item located immediately after the non-native item 509. In this case, the immediately next horizontally-arranged item located immediately after the non-native item 509 is the native item 510. Thus, the server 230 may be configured to verify whether the user 211 interacted with, or in this case clicked on, the native item 510. As a result and recalling the user interactions performed by the user 211 on the training SERP 500, the server 230 determines that the user 211 did not interact with the native item 510 and, therefore, the non-native item 509 is not associated with any negative user interaction that was preformed on items being horizontally-arranged after the non-native item 509.

It should be noted that although the native item 508 has been clicked by the user 211, this user interaction is not considered by the server 230 as a negative user interaction associated with the non-native item 509 since the native item 508 is not the immediately next horizontally-arranged item, but is rather an immediately previous horizontally-arranged item located immediately before the non-native item 509.

It should be noted that although the native item 511 has been clicked by the user 211, this user interaction is not considered by the server 230 as a negative user interaction associated with the non-native item 509 since the native item 511 is not the immediately next horizontally-arranged item, but is rather a second next horizontally-arranged item which is not located immediately after the non-native item 509.

During the analysis of the user interactions associated with items being vertically-arranged after the non-native item 509, the server 230 is configured to determine a vertical proximity zone 602 for the non-native item 509.

Generally speaking, a given vertical proximity zone for a given non-native item is defined (i) in a following row located immediately below a current row of the given non-native item, and (ii) between horizontal borders of the given non-native item. In other words, the given vertical proximity zone for the given non-native item may be defined as a zone that would be overlapped by the given non-native item while the given non-native item is hypothetically "dragged" vertically from its current row into the following row located immediately below its current row.

Therefore, the vertical proximity zone 602 for the non-native item 509 is defined (i) in a third row of the plurality of vertically-arranged rows 540 located immediately below the second row of the plurality of vertically-arranged rows 540, which is the current row of the non-native item 509, and (ii) between horizontal borders (not separately numbered) of the non-native item 509.

Also, after determining the vertical proximity zone 602 for the non-native item 509 and during the analysis of the user interactions associated with items being vertically-arranged after the non-native item 509, the server 230 may be configured to analyze user interactions associated with items being at least partially overlapped by the vertical proximity zone 602 of the non-native item 509.

In this case, the server 230 may be configured to analyze user interactions associated with any item located in the third row (i.e., the following row to the current row of the non-native item 509) and that are at least partially overlapped by the vertical proximity zone 602. The only item that is at least partially overlapped by the vertical proximity zone 602 is the native item 515. Thus, the server 230 may be configured to verify whether the user 211 interacted with the native item 515. As a result and recalling the user interactions performed by the user 211 on the training SERP 500, the server 230 determines that the user 211 interacted with the native item 515 and, therefore, the non-native item 509 is associated with one negative user interaction that was preformed on a given item being vertically-arranged (in this case the native item 515) after the non-native item 509.

Now that the server 230 determined both the positive and the negative user interactions associated with the non-native item 509, the server 230 is configured to generate the respective usefulness score for the non-native item 509 located at its respective visual position. The server 230 may apply Equation 1 in order to generate the usefulness score by using a value of "0" for the win, since the non-native item 509 is not associated with any positive user interactions, and a value of "1" for the loss, since the non-native item 509 is associated with one negative user interaction that was preformed on a given item being vertically-arranged (in this case the native item 515) after the non-native item 509.

It should be noted that the usefulness score of a given non-native item may vary based on the given visual position thereof. Indeed, the user 211 might have interacted differently with (i) with the non-native item 509, (ii) items being horizontally-arranged after the non-native item 509 and (iii) items being vertically-arranged after the non-native item 509 if the non-native item 509 was associated with a different visual position on the training SERP 500. Additionally, as will be described in a following example, the respective visual position of a given non-native item may influence a number of items overlapped by the respective vertical proximity zone.

Usefulness Score of the Non-Native Item 522

In a second example, an illustration of how the server 230 determines the usefulness score of the non-native item 522 will be described. The server 230 may be configured to analyze (i) the user interactions associated with the non-native item 522, (ii) the user interactions associated with items being horizontally-arranged after the non-native item 522, and (iii) the user interactions associated with items being vertically-arranged after the non-native item 522 in order to (a) determine both positive and negative user interactions associated with the non-native item 522 and, in turn, in order to (b) generate the respective usefulness score for the non-native item 522 located at its respective visual position. It should be noted that in this example the non-native item 522 is not visually positioned (vertically nor horizontally) next to any other non-native item.

During the analysis of the user interactions associated with the non-native item 522, the server 230 may be configured to verify whether the user 211 interacted with, or in this case clicked on, the non-native item 522. As a result of the analysis of the user interactions associated with the non-native item 522 and recalling the user interactions performed by the user 211 on the training SERP 500, the server 230 determines that the user 211 did interact with the non-native item 522 and, therefore, the non-native item 522 is associated with one positive user interaction.

During the analysis of the user interactions associated with items being horizontally-arranged after the non-native item 522, the server 230 may be configured to analyze the user interactions associated with the immediately next horizontally-arranged item located immediately after the non-native item 522. In this case, the immediately next horizontally-arranged item located immediately after the non-native item 522 is the native item 523. Thus, the server 230 may be configured to verify whether the user 211 interacted with, or in this case clicked on, the native item 523. As a result and recalling the user interactions performed by the user 211 on the training SERP 500, the server 230 determines that the user 211 did not interact with the native item 523 and, therefore, the non-native item 522 is not associated with any negative user interaction that was preformed on items being horizontally-arranged after the non-native item 522.

It should be noted that although the native item 525 has been clicked by the user 211, this user interaction is not considered by the server 230 as a negative user interaction associated with the non-native item 522 since the native item 525 is not the immediately next horizontally-arranged item.

During the analysis of the user interactions associated with items being vertically-arranged after the non-native item 522, the server 230 may be configured to determine a vertical proximity zone 604 for the non-native item 522.

The vertical proximity zone 604 may be determined for the non-native item 522 similarly to how the vertical proximity zone 602 is determined for the non-native item 509. As such, the vertical proximity zone 604 for the non-native item 522 is defined (i) in a fifth row of the plurality of vertically-arranged rows 540 located immediately below a fourth row of the plurality of vertically-arranged rows 540, which is the current row of the non-native item 522, and (ii) between horizontal borders of the non-native item 522.

Also, after determining the vertical proximity zone 604 for the non-native item 522 and during the analysis of the user interactions associated with items being vertically-arranged after the non-native item 522, the server 230 may be configured to analyze user interactions associated with items that are at least partially overlapped by the vertical proximity zone 604 of the non-native item 522.

In this case, the server 230 may be configured to analyze user interactions associated with any item located in the fifth row (i.e., the following row to the current row of the non-native item 522) and that are at least partially overlapped by the vertical proximity zone 604. In this case, two items are at least partially overlapped by the vertical proximity zone 604 (unlike one item as in the first example), namely the native items 528 and 529. Thus, the server 230 may be configured to verify whether the user 211 interacted with the native items 528 and 529. As a result and recalling the user interactions performed by the user 211 on the training SERP 500, the server 230 determines that the user 211 interacted with the native item 528 and did not interact with the native item 529 and, therefore, the non-native item 522 is associated with one negative user interaction that was preformed on a given item being vertically-arranged (in this case the native item 528) after the non-native item 522.

Now that the server 230 determined both the positive and the negative user interactions associated with the non-native item 522, the server 230 is configured to generate the respective usefulness score for the non-native item 522 located at its respective visual position. The server 230 may apply the Equation 1 in order to generate the usefulness score by using a value of "1" for the win, since the non-native item 522 is associated with one positive user interaction, and a value of "1" for the loss, since the non-native item 522 is associated with one negative user interaction that was preformed on a given item being vertically-arranged (in this case the native item 528) after the non-native item 522.

In some embodiments of the present technology, prior to generating a respective usefulness score for a given non-native item located at a respective visual position, the server 230 may be configured to determine whether the given non-native item is part of a visual group of non-native items.

Broadly speaking, the server 230 may be configured to identify a given visual group of non-native items if a given non-native item is immediately horizontally-arranged or immediately vertically-arranged next to any other given non-native item.

For example, the server 230 may be configured to identify a visual group of non-native items 610 that comprises two immediately horizontally-arranged non-native items, namely the non-native items 504 and 505. It is contemplated that the server 230 may be configured to identify a given visual group of non-native items when N non-native items are immediately horizontally-arranged one after another and where N is an integer superior to one (1).

In another example, the server 230 may be configured to identify a visual group of non-native items 612 that comprises two immediately vertically-arranged non-native items, namely the non-native items 518 and 524. It is contemplated that the server 230 may be configured to identify a given visual group of non-native items when N non-native items are immediately vertically-arranged one after another and where N is an integer superior to one (1).

How the usefulness scores for non-native items that are in visual groups of non-native items are generated by the server 230 will now be described with respect to two examples, one for each one of the visual groups of non-native items 610 and 612.

Usefulness Scores of the Non-Native Items 504 and 505 in the Visual Group of Non-Native Items 610

As previously mentioned, the visual group of non-native items 610 includes at least two immediately horizontally-arranged non-native items, namely the non-native items 504 and 505.

The generation of the usefulness score for the non-native item 504 located at its respective visual position and which is in the visual group of non-native items 610 will now be described.

In this example, when generating the usefulness score for the non-native item 504, the server 230 may be configured to analyze (i) the user interactions associated with each one of the at least two immediately horizontally-arranged non-native items in the visual group of non-native items 610, namely the user interactions associated with the non-native items 504 and 505, (ii) the user interactions associated with N immediately next horizontally-arranged items after the at least two immediately horizontally-arranged non-native items of the visual group of non-native items 610 (where N is equal to a number of items amongst the at least two immediately horizontally-arranged non-native items of the visual group of non-native items 610), and (iii) the user interactions associated with items being vertically-arranged after the at least two immediately horizontally-arranged non-native items of the visual group of non-native items 610 in order to (a) determine both positive and negative user interactions associated with the non-native item 504 and, in turn, in order to (b) generate the respective usefulness score for the non-native item 504 located at its respective visual position.

During the analysis of the user interactions associated with each one of the at least two immediately horizontally-arranged non-native items in the visual group of non-native items 610, namely the user interactions associated with the non-native items 504 and 505, the server 230 may be configured to verify whether the user 211 interacted with, or in this case clicked on, the non-native items 504 and 505.

As a result of the analysis of the user interactions associated with each one of the at least two immediately horizontally-arranged non-native items in the visual group of non-native items 610 and recalling the user interactions performed by the user 211 on the training SERP 500, the server 230 determines that the user 211 did interact with the non-native item 504, but did not interact with the non-native item 505 and, therefore, the non-native item 504 is associated with one positive user interaction.

During the analysis of the user interactions associated with the N immediately next horizontally-arranged items after the at least two immediately horizontally-arranged non-native items of the visual group of non-native items 610 (where N is equal to the number of items amongst the at least two immediately horizontally-arranged non-native items of the visual group of non-native items 610), in this case, the server 230 may be configured to analyze the user interactions associated with the two immediately next horizontally-arranged item located immediately after the two immediately horizontally-arranged non-native items (the non-native items 514 and 505). Therefore, the server 230 may be configured to analyze the user interactions associated with the native items 506 and 507. Thus, the server 230 may be configured to verify whether the user 211 interacted with, or in this case clicked on, the native items 506 and 507.

As a result and recalling the user interactions performed by the user 211 on the training SERP 500, the server 230 determines that the user 211 did interact with the native item 506 but did not interact with the native item 507 and, therefore, the non-native item 504 is associated with one negative user interaction that was preformed on the N (in this case two) immediately next horizontally-arranged items (in this case native items 506 and 507) after the at least two immediately horizontally-arranged non-native items (in this case the non-native items 504 and 505) of the visual group of non-native items 610.

During the analysis of the user interactions associated with items being vertically-arranged after the at least two immediately horizontally-arranged non-native items of the visual group of non-native items 610, the server 230 may be configured to determine a vertical proximity zone 606 for the visual group of non-native items 610.

In this case, the vertical proximity zone 606 for the visual group of non-native items 610 is defined (i) in the second row of the plurality of vertically-arranged rows 540 located immediately below the first row of the plurality of vertically-arranged rows 540, which is the current row of the at least two immediately horizontally-arranged non-native items (the non-native items 504 and 505), and (ii) between horizontal borders of the visual group of non-native items 610. It is contemplated that the horizontal borders of the visual group of non-native items 610 are the most distant horizontal borders amongst all horizontal borders of the at least two immediately horizontally-arranged non-native items of the visual group of non-native items 610.

Also, after determining the vertical proximity zone 606 for the visual group of non-native items 610 and during the analysis of the user interactions associated with items being vertically-arranged after the at least two immediately horizontally-arranged non-native items of the visual group of non-native items 610, the server 230 may be configured to analyze user interactions associated with items that are at least partially overlapped by the vertical proximity zone 606 of the visual group of non-native items 610. In this case, the server 230 may be configured to analyze user interactions associated with any item located in the second row (i.e., the following row to the current row of the non-native items 504 and 505) and that are at least partially overlapped by the vertical proximity zone 606. In this case, two items are at least partially overlapped by the vertical proximity zone 606, namely the native items 511 and 512. Thus, the server 230 may be configured to verify whether the user 211 interacted with the native items 511 and 512.

As a result and recalling the user interactions performed by the user 211 on the training SERP 500, the server 230 determines that the user 211 interacted with the native item 511 and did not interact with the native item 512 and, therefore, the non-native item 504 is associated with one negative user interaction that was preformed on a given item being vertically-arranged after the at least two immediately horizontally-arranged non-native items (in this case the native item 511) of the visual group of non-native items 610.

Now that the server 230 determined both the positive and the negative user interactions associated with the non-native item 504, the server 230 is configured to generate the respective usefulness score for the non-native item 504 located at its respective visual position. The server 230 may apply the equation 1 in order to generate the usefulness score by using a value of "1" for the win, since the non-native item 504 is associated with one positive user interaction, and a value of "2" for the loss, since the non-native item 504 is associated with two negative user interactions.

The generation of the usefulness score for the non-native item 505 located at its respective visual position and which is in the visual group of non-native items 610 will now be described.

In this example, when generating the usefulness score for the non-native item 505, the server 230 may be configured to analyze (i) the user interactions associated with each one of the at least two non-native items in the visual group of non-native items 610, namely the user interactions associated with the non-native items 504 and 505, (ii) the user interactions associated with the N immediately next horizontally-arranged items after the at least two immediately horizontally-arranged non-native items of the visual group of non-native items 610 (where N is equal to a number of items amongst the at least two immediately horizontally-arranged non-native items of the visual group of non-native items 610), and (iii) the user interactions associated with items being vertically-arranged after the at least two immediately horizontally-arranged non-native items of the visual group of non-native items 610 in order to (a) determine both positive and negative user interactions associated with the non-native item 505 and, in turn, in order to (b) generate the respective usefulness score for the non-native item 505 located at its respective visual position.

It shall be understood that the user interactions that are analyzed during the generation of the usefulness score for the non-native item 504 located at its respective visual position are identical to the user interactions that are analyzed during the generation of the usefulness score for the non-native item 505 located at its respective visual position. Indeed, since the non-native items 504 and 505 are both in the visual group of non-native items 610, the non-native items 504 and 505 will both be associated with an identical usefulness score but this identical usefulness score will be associated with (i) the non-native item 504 located at a visual position of the non-native item 504 and (ii) the non-native item 505 located at a visual position of the non-native item 505.

In other words, it is contemplated that all non-native items in a given visual group of non-native items may be associated with an identical usefulness score but that usefulness score will be associated with each of one those non-native items being at their respective visual positions.

Usefulness Scores of the Non-Native Items 518 and 524 in the Visual Group of Non-Native Items 612

As previously mentioned, the visual group of non-native items 612 includes at least two immediately vertically-arranged non-native items located in immediately adjacent rows, namely the non-native items 518 and 524 in immediately adjacent third and fourth rows.

The generation of the usefulness score for the non-native item 518 located at its respective visual position and which is in the visual group of non-native items 612 will now be described.

In this example, when generating the usefulness score for the non-native item 518, the server 230 may be configured to analyze (i) the user interactions associated with each one of the at least two immediately vertically-arranged non-native items in the visual group of non-native items 612, namely the user interactions associated with the non-native items 518 and 524, (ii) the user interactions associated with immediately next horizontally-arranged items located immediately after the at least two immediately vertically-arranged non-native items of the visual group of non-native items 612, and (iii) the user interactions associated with items being vertically-arranged after the at least two immediately vertically-arranged non-native items of the visual group of non-native items 612 in order to (a) determine both positive and negative user interactions associated with the non-native item 518 and, in turn, in order to (b) generate the respective usefulness score for the non-native item 518 located at its respective visual position.

During the analysis of the user interactions associated with each one of the at least two immediately vertically-arranged non-native items in the visual group of non-native items 612, namely the user interactions associated with the non-native items 518 and 524, the server 230 may be configured to verify whether the user 211 interacted with, or in this case clicked on, the non-native items 518 and 524.

As a result of the analysis of the user interactions associated with each one of the at least two immediately vertically-arranged non-native items in the visual group of non-native items 612 and recalling the user interactions performed by the user 211 on the training SERP 500, the server 230 determines that the user 211 did interact with the non-native item 518, but did not interact with the non-native item 524 and, therefore, the non-native item 518 is associated with one positive user interaction.

During the analysis of the user interactions associated with the immediately next horizontally-arranged items located immediately after the at least two immediately vertically-arranged non-native items of the visual group of non-native items 612, in this case, the server 230 may be configured to analyze the user interactions associated with the native items 519 and 525. Thus, the server 230 may be configured to verify whether the user 211 interacted with, or in this case clicked on, the native items 519 and 525.

As a result and recalling the user interactions performed by the user 211 on the training SERP 500, the server 230 determines that the user 211 did interact with the native item 525 but did not interact with the native item 519 and, therefore, the non-native item 518 is associated with one negative user interaction that was preformed on the immediately next horizontally-arranged items (in this case the native items 519 and 525) located immediately after the at least two immediately vertically-arranged non-native items (in this case the non-native items 518 and 524) of the visual group of non-native items 612.

During the analysis of the user interactions associated with items being vertically-arranged after the at least two immediately vertically-arranged non-native items of the visual group of non-native items 612, the server 230 may be configured to determine a vertical proximity zone 608 for the visual group of non-native items 612.

In this case, the vertical proximity zone 608 for the visual group of non-native items 612 is defined (i) in N following rows located immediately below a lowest row of the immediately adjacent rows of the at least two immediately vertically-arranged non-native items (where N is equal to a number of items amongst the at least two immediately vertically-arranged non-native items) and (ii) between horizontal borders of the visual group of non-native items 612. In other words, the vertical proximity zone 608 for the visual group of non-native items 612 is defined in (i) the two following rows located immediately below the fourth row (the lowest row of the immediately adjacent rows of the at least two immediately vertically-arranged non-native items), namely the fifth and the sixth row, and (ii) between the most distant horizontal borders amongst all horizontal borders of the at least two immediately vertically-arranged non-native items of the visual group of non-native items 612.

Also, after determining the vertical proximity zone 608 for the visual group of non-native items 612 and during the analysis of the user interactions associated with items being vertically-arranged after the at least two immediately vertically-arranged non-native items of the visual group of non-native items 612, the server 230 may be configured to analyze user interactions associated with items that are at least partially overlapped by the vertical proximity zone 608 of the visual group of non-native items 612. In this case, the server 230 may be configured to analyze user interactions associated with any item located in the fifth and the sixth rows (i.e., the two following rows after the lowest row of the non-native items 518 and 524) and that are at least partially overlapped by the vertical proximity zone 608. In this case, three items are at least partially overlapped by the vertical proximity zone 608, namely the native items 530, 535 and 536. Thus, the server 230 may be configured to verify whether the user 211 interacted with the native items 530, 535 and 536.

As a result and recalling the user interactions performed by the user 211 on the training SERP 500, the server 230 determines that the user 211 interacted with the native item 536 and did not interact with either one of the native items 530 and 535 and, therefore, the non-native item 518 is associated with one negative user interaction that was preformed on the items being vertically-arranged after the at least two immediately vertically-arranged non-native items of the visual group of non-native items 612.

Now that the server 230 determined both the positive and the negative user interactions associated with the non-native item 518, the server 230 is configured to generate the respective usefulness score for the non-native item 518 located at its respective visual position. The server 230 may apply the equation 1 in order to generate the usefulness score by using a value of "1" for the win, since the non-native item 518 is associated with one positive user interaction, and a value of "2" for the loss, since the non-native item 518 is associated with two negative user interactions.

In an alternative embodiment, the server 230 may use weighted values of negative user interactions in order to determine a given value for the loss. In other words, the server 230 may be configured to weigh the value of a given negative user interactions based on a distance between a given visual group of items and the item on which the negative interaction was performed. For example, the negative user interaction that was preformed on the native item 525 may be associated with a weight of "1", since the native item 525 is a first horizontally next item to (is horizontally adjacent to) the visual group of non-native items 612, while the negative user interaction that was preformed on the native item 536 may be associated with a weight of "½", since the native item 536 is a second vertically next item to the visual group of non-native items 612. Therefore, in this alternative embodiment, the server 230 may use a value of "1.5" for the loss (e.g., 1*1 for the negative user interaction that was preformed on the native item 525 and 1*½ for the negative user interaction that was preformed on the native item 536).

The generation of the usefulness score for the non-native item 524 located at its respective visual position and which is in the visual group of non-native items 612 will now be described.

In this example, when generating the usefulness score for the non-native item 524, the server 230 may be configured to analyze (i) the user interactions associated with each one of the at least two immediately vertically-arranged non-native items in the visual group of non-native items 612, namely the user interactions associated with the non-native items 518 and 524, (ii) the user interactions associated with immediately horizontally-arranged items located immediately after the at least two immediately vertically-arranged non-native items of the visual group of non-native items 612, and (iii) the user interactions associated with items being vertically-arranged after the at least two immediately vertically-arranged non-native items of the visual group of non-native items 612 in order to (a) determine both positive and negative user interactions associated with the non-native item 524 and, in turn, in order to (b) generate the respective usefulness score for the non-native item 524 located at its respective visual position.

It shall be understood that the user interactions that are analyzed during the generation of the usefulness score for the non-native item 518 located at its respective visual position are identical to the user interactions that are analyzed during the generation of the usefulness score for the non-native item 524 located at its respective visual position. Indeed, since the non-native items 518 and 524 are both in the visual group of non-native items 612, the non-native items 518 and 524 will both be associated with an identical usefulness score but this identical usefulness score will be associated with the non-native item 518 located at a visual position of the non-native item 518 and will be associated with the non-native item 524 located at a visual position of the non-native item 524.

It is contemplated that in some embodiments of the present technology, the server 230 may be configured to generate a given usefulness score for a given non-native item which is in a given visual group of non-native item for its respective visual position and then, instead of generating a given usefulness score for another given non-native item which is in the same given visual group of non-native item for its respective visual position, the server 230 may be configured to assign a same given usefulness score that was generated for the given non-native item to the another given non-native item but for the respective position of the another given non-native item.

In additional embodiments of the present technology, given non-native items in a given visual group of non-native items may be associated with different usefulness scores. In other words, it is contemplated that each non-native item in the visual group of non-native items may be associated with different positive user interactions. For example, the positive user interactions associated with a given non-native item in the visual group of non-native items may be determined based on an analysis of user interactions associated solely with the given non-native item in the visual group of non-native items, instead of being based on an analysis of user interactions associated with each one of the non-native items in the visual group of non-native items.

It is also contemplated that each non-native item in the visual group of non-native items may be associated with different negative user interactions. For example, for a given non-native item in a given visual group of non-native items, during the analysis of the user interactions associated with the immediately next horizontally-arranged items located immediately after non-native items of the given visual group of non-native items, the server 230 may be configured to analyze the user interactions associated solely with the immediately next horizontally-arranged items located immediately after the given non-native item, instead of analyzing the user interactions associated with the immediately next horizontally-arranged items located immediately after each non-native item of the given visual group of non-native items.

During the training-phase of the ranking system 250, after generating a respective usefulness score for each one of the plurality of non-native items 410 (see FIG. 4) located at their respective visual positions, the server 230 is configured to train the usefulness-score-prediction algorithm 304 (see FIG. 3) to predict a respective usefulness score for a given in-use non-native item for a respective rank position in a given ranked list of in-use items in response to a given in-use query. How the server 230 trains the usefulness-score-prediction algorithm 304 will now be described.

During a first training iteration of the usefulness-score-prediction algorithm 304 which is a given MLA, the server 230 may be configured to input into the usefulness-score-prediction algorithm 304 (i) the ranked list of items 420, (ii) the SERP features of the training SERP 500 and (iii) the respective usefulness score of each one of the plurality of non-native items 410 in the ranked list of items 420. It can be said that the usefulness-score-prediction algorithm 304 learns, in a sense, hidden relationships and data patterns amongst (i) the ranked list of items 420, (ii) the SERP features of the training SERP 500 and (iii) the respective usefulness score of each one of the plurality of non-native items 410 in order to find logical patterns between usefulness scores of each one of the plurality of non-native items 410 and their respective ranked positions in the ranked list of items 420 in view of the SERP features of the training SERP 500 and, therefore, further in view of their respective visual positions on the training SERP 500.

After a large number of training iterations executed similarly to the first training iteration but with different ranked list of items, different training SERPs and therefore different SERP features and different usefulness scores for different non-native items, the usefulness-score-prediction algorithm 304 is able to output (predict), based on (i) given SERP features of a given SERP and (ii) a given ranked list of native items, a respective usefulness score for a given non-native item for each possible rank position of the given non-native item if the given non-native item would be artificially inserted in the given ranked list of native items at each possible rank position and then displayed on the given SERP associated with the given SERP features.

After the completion of the training phase of the ranking system 250 during which the usefulness-score-prediction algorithm 304 has been trained to predict a respective usefulness score for a given in-use non-native item for a respective rank position in a given ranked list of in-use items in response to a given in-use query, an in-use phase of the ranking system 250 may begin.

During the in-use phase of the ranking system 250, the ranking server 250 may be configured to acquire a submission data packet 282 via the communications network 240. The submission data packet 282 may be sent by, for example, the electronic device 212 associated with the user 213. The submission data packet 282 may comprise information indicative of an in-use query submitted by the user 213 to the search engine of the server 230. Moreover, the submission data packet 282 may comprise information indicative of at least some SERP-centric features associated with an in-use SERP as if the in-use SERP was visually displayed in the browsing application of the electronic device 212. For example, the submission data packet 282 may comprise information indicative of a window size of the browser application of the electronic device 212 in which the user 213 is desirous of being displayed with the in-use SERP.

After acquiring the submission data packet 282, the server 230 may analyze the content of the submission data packet 282 and may identify query features associated with the in-use query submitted by the user 213. The server 230 may then select generally-relevant items from the database 260 in response to the in-use query similarly to how the server 230 selected the generally-relevant items from the database 260 in response to the query submitted by the user 211.

Let it be assumed that the generally-relevant items selected by the server 230 from the database 260 in response to the in-use query comprises a plurality of in-use native items and an in-use non-native item. The server 230 may be configured to identify information indicative of at least some SERP-centric features based on the plurality of in-use native items and the in-use non-native item. For example, the server 230 may retrieve respective item sizes of each in-use item amongst the plurality of in-use native items and the in-use non-native item.

As such, the server 230 may input the plurality of the in-use native items, their respectively associated previous user interactions and the in-use query into the user-interaction-based ranking algorithm 302 of the ranking system 250. As a result, the user-interaction-based ranking algorithm 302 may generate a ranked list of in-use native items in response to the in-use query submitted by the user 213.

The server 230 is then configured to determine an optimal rank position of the in-use non-native item in a ranked list of in-use items that will be displayed to the user 213. In order to determine the optimal rank position of the in-use non-native item in the ranked list of in-use items, the server 230 is configured to input into the now-trained usefulness-score-prediction algorithm 304 of the ranking system 250 (i) the ranked list of in-use native items generated by the user-interaction-based ranking algorithm 302 and (ii) the SERP features of the in-use SERP.

As a result, the usefulness-score-prediction algorithm 304 will output (predict) a respective usefulness score for the in-use non-native item for each possible rank position of the in-use non-native item in the ranked list of in-use items if the in-use non-native item would be artificially inserted at that rank position and then displayed to the user 213 in the in-use SERP in the window of the browser application of the electronic device 212.

The server 230 may then compare all the usefulness scores predicted for the in-use non-native item and is configured to identify the highest usefulness score predicted for the in-use non-native item. As such, the server 230 determines that the optimal rank position of the in-use non-native item in the ranked list of in-use items is the rank position associated with the highest usefulness score predicted for the in-use non-native item.

The server 230 is also configured to insert the in-use non-native item in the ranked list of in-use native items at the optimal ranked position thereby forming the ranked list of in-use items. The server 230 is also configured to trigger a visual display of the in-use items of the ranked list of in-use items on the in-use SERP to the user 213 of the electronic device 212. To that end, the server 230 is configured to generate the response data packet 292 comprising information indicative of the ranked list of in-use items and triggering information. The server 230 may send the response data packet 292 to the electronic device 212 via the communications network 240. The response data packet 292 comprises the triggering information for triggering the browser application to display to the user 211 via the display 150 of the electronic device 212 the in-use SERP.

Figure 7:
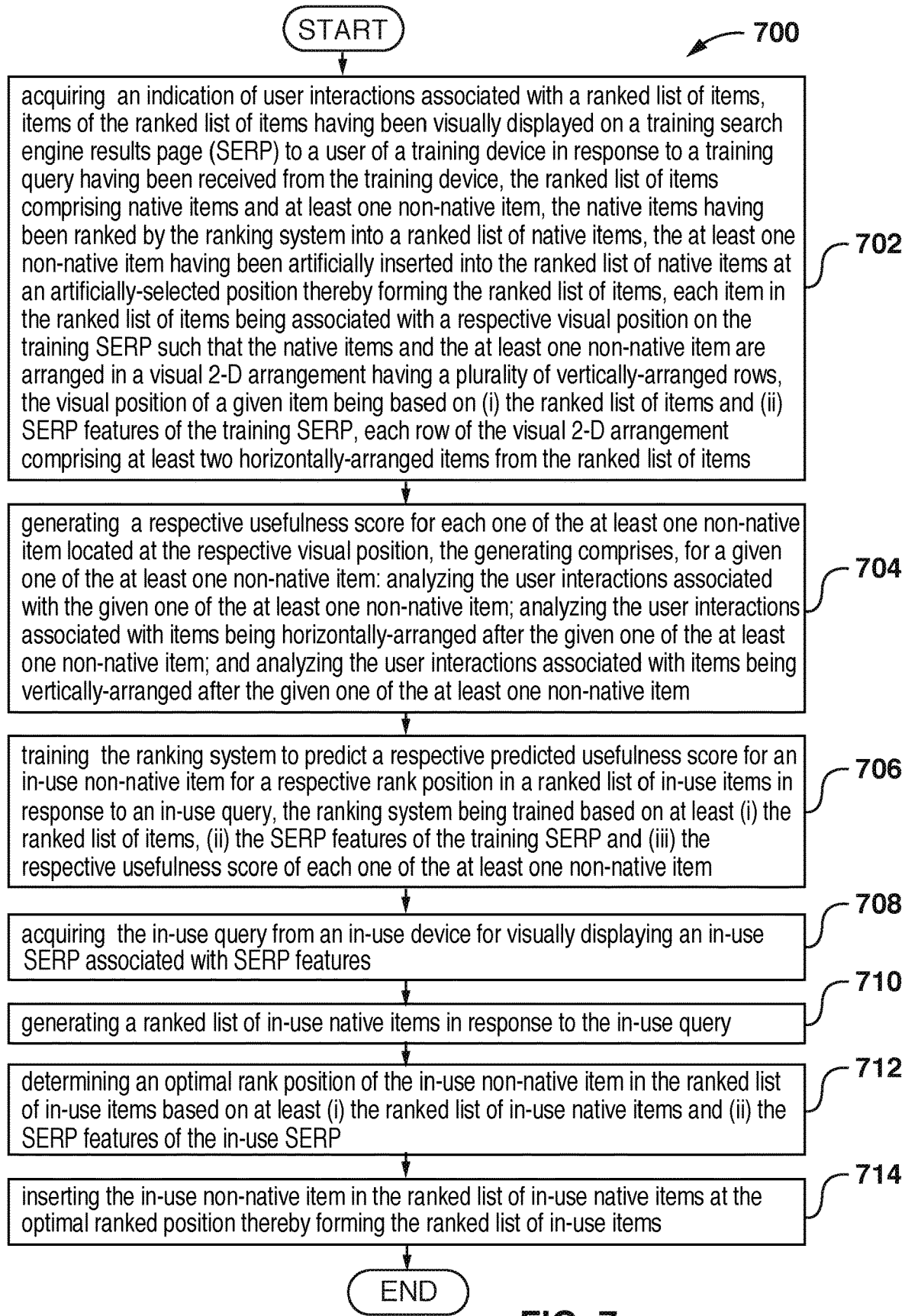
FIG. 7 is a block diagram depicting a flow chart of a method of determining rank positions of non-native items by the ranking system of FIG. 3 according to some implementations of the present technology.

With reference to FIG. 7, there is depicted a block diagram of a method 700 of determining rank positions of non-native items by the ranking system 250. The ranking system 250 has been trained to rank given native items based on previous user interactions associated with these native items and given non-native items are associated with limited previous user interactions and, therefore, are non-rankable by the ranking system 250. The method 700 is executable by the server 230 and comprises a training-phase of the ranking system 250 and an in-use phase of the ranking system 250. The method 700 will now be described.

Step 702: Acquiring an Indication of User Interactions Associated with a Ranked List of Items The method 700 begins with a step 702, during the training-phase of the ranking system 250, with the server 230 acquiring the indication of user interactions associated with the ranked list of items 420 (see FIG. 4).

In some embodiments, the user interactions comprise at least one of:
 a selection of a given item;
 a long selection of the given item;
 the selection of the given item followed by a web resource transition; and
 a hovering action over the given item.

The items of the ranked list of items 420 have been visually displayed on the training SERP 500 (see FIG. 5) to the user 211 of the electronic device 210 in response to the query "Explosion in metro" that has been received from the electronic device 210. As previously mentioned, the information indicative of the query submitted by the user 211 may be received by the server 230 in the submission data packet 280 via the communications network 240.

In some embodiments, the items in the ranked list of items 420 can be one of the image-type item and the video-type item.

The ranked list of items 420 comprises the native items 501, 502, 503, 506, 507, 508, 510, 511, 512, 513, 514, 515, 516, 517, 519, 520, 521, 523, 525, 526, 527, 528, 529, 530, 531, 532, 533, 534, 535 and 536 and at least one non-native item. In this case, the at least one non-native item corresponds to the non-native items 504, 505, 509, 518, 522 and 524. The native items 501, 502, 503, 506, 507, 508, 510, 511, 512, 513, 514, 515, 516, 517, 519, 520, 521, 523, 525, 526, 527, 528, 529, 530, 531, 532, 533, 534, 535 and 536 have been ranked by the ranking system 250, via the user-interaction-based ranking algorithm 302 (see FIG. 3) into the ranked list of native items 400.

In some embodiments, the server 230 may host a computer-executed service, such as a search engine and the ranking system 250 may be implemented by the computer-executed service. The native items 501, 502, 503, 506, 507, 508, 510, 511, 512, 513, 514, 515, 516, 517, 519, 520, 521, 523, 525, 526, 527, 528, 529, 530, 531, 532, 533, 534, 535 and 536 can be used items having been frequently used by users of the computer-executed service and the non-native items 504, 505, 509, 518, 522 and 524 are fresh items that have been insufficiently used by the users of the computer-executed service and thus are non-rankable by the user-interaction-based ranking algorithm 302 (native ranking algorithm) of the ranking system 250.

The at least one non-native item has been artificially inserted into the ranked list of native items 400 at an artificially-selected position thereby forming the ranked list of items 420. This artificial insertion may be executed as part of the artificial merging procedure performable by the ranking system 250.

In some embodiments, the at least one non-native item may be at least one non-native item randomly inserted in the ranked list of native items 400. In other embodiments, the at least one non-native item may be at least one non-native item inserted in the ranked list of native items 400 according to a predetermined insertion pattern.

Each item in the ranked list of items 420 is associated with a respective visual position on the training SERP 500 such that the native items 501, 502, 503, 506, 507, 508, 510, 511, 512, 513, 514, 515, 516, 517, 519, 520, 521, 523, 525, 526, 527, 528, 529, 530, 531, 532, 533, 534, 535 and 536 and the at least one non-native item are arranged in the visual 2-D arrangement 555 having the plurality of vertically-arranged rows 540. The visual position of a given item is based on (i) the ranked list of items 420 and (ii) the SERP features of the training SERP 500. Each row of the visual 2-D arrangement 555 comprises at least two horizontally-arranged items from the ranked list of items 420.

Generally speaking, the SERP features of a given SERP may comprise:
 query features associated with the respective query;
 a window size of a browser application displaying the given SERP; and
 a visual item size of each item in the respective ranked list of items.

In some embodiments, the query features of a given query may comprise a recent submission frequency of the given query to the server 230 as part of executing a search. At least some query features may be stored in the database 260 along with information indicative of all items that can be potentially presented to a given user as part of executing the search.

In some embodiments of the present technology, the SERP features of the training SERP 500 comprise SERP-centric features of the training SERP 500 and query features of the query submitted by the user 211 of the electronic device 210.

Step 704: Generating, by the Server, a Respective Usefulness Score for Each One of the at Least One Non-Native Item Located at the Respective Visual Position The method 700 continues to step 704, during the training-phase of the ranking system 250, with the server 230 generating a respective usefulness score for each one of the at least one non-native item located at the respective visual position.

Broadly speaking, during the generation of a respective usefulness score for a given non-native item located at a respective visual position, the server 230 is configured to (i) analyze the user interactions associated with the given non-native item; (ii) analyze the user interactions associated with items being horizontally-arranged after the given non-native item; and (iii) analyze the user interactions associated with items being vertically-arranged after the given non-native item.

The present technology revolves around the assumption that user interactions with a given non-native item at a respective visual position are suggestive of the fact that the given non-native item has been appropriately visually positioned on the training SERP 500. Therefore, the user interactions associated with the given non-native are considered to be indicative of positive user interactions with that given non-native item.

The present technology also revolves around the assumption that user interactions with items being horizontally-arranged after the given non-native item and/or with items being vertically-arranged after the given non-native item are suggestive of the fact that the given non-native item has not been appropriately visually positioned on the training SERP 500. Therefore, the user interactions associated with the items being horizontally-arranged after the given non-native item and/or with the items being vertically-arranged after the given non-native item are considered to be indicative of negative user interactions with that given non-native item.

The server 230 may be configured to generate the respective usefulness score for the given non-native item being located at the given visual position according to a surplus function which takes into account both positive and negative user interactions with a given non-native item, such as:

$$\text{Surplus}(\text{win},\text{loss}) = a*\text{win} + b*\text{loss} \tag{1}$$

where a win is determined by respective positive user interactions and a loss is determined by the respective negative user interactions. It should be noted that a weight coefficient b may be of an opposite sign to a weight coefficient a.

Therefore, in some embodiments of present technology, the server 230 may generate a respective usefulness score for a given non-native item being located at a given visual position based on the weighted sum of the respective positive user interactions and of the respective negative user interactions.

In some embodiments of the present technology, the analyzing the user interactions associated with items being horizontally-arranged after the given one of the at least one non-native item may comprise analyzing, by the server 230, the user interactions associated with the immediately next horizontally-arranged item located immediately after the given one of the at least one non-native item.

It is also contemplated that the analyzing the user interactions associated with items being vertically-arranged after the given one of the at least one non-native item comprises determining, by the server 230, a given vertical proximity zone for the given one of the at least one non-native item based on the SERP features. For example, the server 230 is configured to generate the vertical proximity zone 604 (see FIG. 6) for the non-native item 522 based on the SERP features of the training SERP 500. As such, the server 230 may analyze the user interactions associated with items being at least partially overlapped by the vertical proximity zone 604, namely the user interactions associated with the native items 528 and 529.

A given vertical proximity zone is defined (i) in a following row located immediately below a current row of the given one of the at least one non-native item; and (ii) between horizontal borders of the given one of the at least one non-native item.

In some embodiments, the analyzing the user interactions associated with items being vertically-arranged after the given one of the at least one non-native item may comprise analyzing, by the server 230, user interactions associated with any item located in the following row and at least partially overlapped by the given vertical proximity zone. Again, in the example of the vertical proximity zone 604 of the non-native item 522, items that are located in the following row and which are at least partially overlapped by the vertical proximity zone 604 are native items 528 and 529.

In other embodiments of the present technology, the at least one non-native item may comprise a given visual group of non-native items. For example, the visual group of non-native items 610 may include at least two immediately horizontally-arranged non-native items such as the non-native items 504 and 505. In another example, the visual group of non-native items 612 may include at least two immediately vertically-arranged non-native items located in immediately adjacent rows such as the non-native items 518 and 524.

If the given non-native item is in a given visual group of non-native items having the at least two immediately horizontally-arranged non-native items (such as the visual group of non-native items 610), the analyzing the user interactions associated with the given one of the at least one non-native item comprises analyzing, by the server 230, user interactions associated with each one of the at least two immediately horizontally-arranged non-native items, namely the non-native items 504 and 505. Also, the analyzing the user interactions associated with items being horizontally-arranged after the given one of the at least one non-native item comprises: analyzing, by the server 230, the user interactions associated with N immediately next horizontally-arranged items after the at least two immediately horizontally-arranged non-native items of the visual group of non-native items 610 where N is equal to a number of items amongst the at least two immediately horizontally-arranged non-native items of the visual group of non-native items 610. In this case, this means that the user interaction associated with the native items 506 and 507 will be analyzed. Also, the analyzing the user interactions associated with items being vertically-arranged after the given one of the at least one non-native item comprises analyzing, by the server 230, user interactions associated with items that are vertically-arranged after the at least two immediately horizontally-arranged non-native items of the visual group of non-native items 610. In this case, this means that the user interactions associated with the native items 511 and 512 will be analyzed.

If the given non-native item is in a given visual group of non-native items having the at least two immediately vertically-arranged non-native items (such as the visual group of non-native items 612), the analyzing the user interactions associated with the given one of the at least one non-native item comprises analyzing, by the server 230, user interactions associated with each one of the at least two immediately vertically-arranged non-native items, namely the non-native items 518 and 524. In this case, the visual group of non-native items 610 is associated with the vertical proximity zone 608 which is defined (i) in N following rows located immediately below a lowest row of the immediately adjacent rows (i.e., the lowest row being fourth row of the immediately adjacent third and fourth rows), and (ii) between the horizontal borders of the visual group of non-native items 612 and where N is equal to a number of items amongst the at least two immediately vertically-arranged non-native items (i.e., the non-native items 518 and 524). As a result, the analyzing the user interactions associated with items being vertically-arranged after the given one of the at least one non-native item comprises analyzing, by the server 230, user interactions associated with any item located in the N (i.e., two) following rows and at least partially overlapped by the vertical proximity zone 608. This means that the user interactions with the native items 530, 535 and 536 will be analyzed.

Step 706: Training the Ranking System to Predict Predicted Usefulness Scores The method continues to step 704, which is the last step of the training-phase of the ranking system 250, with the server 230 training the ranking system 250, and more specifically the usefulness-score-prediction algorithm 304, to predict a respective predicted usefulness score for a given in-use non-native item for a respective rank position in a given ranked list of in-use items in response to a given in-use query.

The ranking system 250 is trained based on at least (i) the ranked list of items 420, (ii) the SERP features of the training SERP 500 and (iii) the respective usefulness score of each one of the at least one non-native item, namely the non-native items 504, 505, 509, 518, 522 and 524.

Indeed, during a first training iteration of the usefulness-score-prediction algorithm 304 which is a given MLA, the server 230 may be configured to input into the usefulness-score-prediction algorithm 304 (i) the ranked list of items 420, (ii) the SERP features of the training SERP 500 and (iii) the respective usefulness score of each one of the plurality of non-native items 410 in the ranked list of items 420. It can be said that the usefulness-score-prediction algorithm 304 learns, in a sense, hidden relationships and data patterns amongst (i) the ranked list of items 420, (ii) the SERP features of the training SERP 500 and (iii) the respective usefulness score of each one of the plurality of non-native items 410 in order to determine logical patterns between usefulness scores of each one of the plurality of non-native items 410 and their respective ranked positions in the ranked list of items 420 in view of the SERP features of the training SERP 500 and, therefore, further in view of their respective visual positions on the training SERP 500.

After a large number of training iterations executed similarly to the first training iteration but with different ranked list of items, different training SERPs and therefore different SERP features and different usefulness scores for different non-native items, the usefulness-score-prediction algorithm 304 is able to output (predict), based on (i) given SERP features of a given SERP and (ii) a given ranked list of native items, a respective usefulness score for a given non-native item for each possible rank position of the given non-native item if the given non-native item would be artificially inserted in the given ranked list of native items at each possible rank position and then displayed on the given SERP associated with the given SERP features.

Step 708: Acquiring the in-Use Query from an in-Use Device

The method 700 continues to step 708, which is a first step of the in-use phase of the ranking system 250, with the server 230 acquiring the in-use query from the electronic device 212 for visually displaying the in-use SERP associated with SERP features.

Indeed, during the in-use phase of the ranking system 250, the ranking server 250 may be configured to acquire the submission data packet 282 via the communications network 240. The submission data packet 282 may be sent by, for example, the electronic device 212 associated with the user 213. The submission data packet 282 may comprise information indicative of the in-use query submitted by the user 213 to the search engine of the server 230. Moreover, the submission data packet 282 may comprise information indicative of at least some SERP-centric features associated with an in-use SERP as if the in-use SERP was visually displayed in the browsing application of the electronic device 212. For example, the submission data packet 282 may comprise information indicative of the window size of the browser application of the electronic device 212 in which the user 213 is desirous of being displayed with the in-use SERP.

Step 710: Generating a Ranked List of in-Use Native Items in Response to the in-Use Query The method continues to step 710, during the in-use phase of the ranking system 250, with the server 230 generating the ranked list of in-use native items in response to the in-use query submitted by the user 213.

Indeed, after acquiring the submission data packet 282, the server 230 may analyze the content of the submission data packet 282 and may identify query features associated with the in-use query submitted by the user 213. The server 230 may then select generally-relevant items from the database 260 in response to the in-use query similarly to how the server 230 selected the generally-relevant items from the database 260 in response to the query submitted by the user 211.

The server 230 may be configured to identify information indicative of at least some SERP-centric features based on the plurality of in-use native items and the in-use non-native item (i.e., generally-relevant items from the database 260 in response to the in-use query). For example, the server 230 may retrieve respective item sizes of each in-use item amongst the plurality of in-use native items and the in-use non-native item.

As such, the server 230 may input the plurality of the in-use native items, their respectively associated previous user interactions and the in-use query into the user-interaction-based ranking algorithm 302 of the ranking system 250. As a result, the user-interaction-based ranking algorithm 302 may generate the ranked list of in-use native items in response to the in-use query submitted by the user 213.

Step 712: Determining an Optimal Rank Position of the in-Use Non-Native Item

The method 700 continues to step 712, during the in-use phase of the ranking system 250, with the server 230 determining the optimal rank position of the in-use non-native item in the ranked list of in-use items based on at least (i) the ranked list of in-use native items and (ii) the SERP features of the in-use SERP.

Indeed, the server 230 is configured to input into the now-trained usefulness-score-prediction algorithm 304 of the ranking system 250 (i) the ranked list of in-use native items generated by the user-interaction-based ranking algorithm 302 and (ii) the SERP features of the in-use SERP.

As a result, the usefulness-score-prediction algorithm 304 will output (predict) a respective usefulness score for the in-use non-native item for each possible rank position of the in-use non-native item in the ranked list of in-use items if the in-use non-native item would be artificially inserted at that rank position and then displayed to the user 213 in the in-use SERP in the window of the browser application of the electronic device 212.

The server 230 determines that the optimal rank position of the in-use non-native item in the ranked list of in-use items is the rank position associated with the highest usefulness score predicted for the in-use non-native item.

Step 714: Inserting the in-Use Non-Native Item in the Ranked List of in-Use Native Items at the Optimal Ranked Position The method 700 ends at step 714, with the server 230 inserting the in-use non-native item in the ranked list of in-use native items at the optimal ranked position thereby forming the ranked list of in-use items.

The server 230 is also configured to trigger the visual display of the in-use items of the ranked list of in-use items on the in-use SERP to the user 213 of the electronic device 212. To that end, the server 230 is configured to generate the response data packet 292 comprising information indicative of the ranked list of in-use items and triggering information. The response data packet 292 comprises the triggering information for triggering the browser application to display to the user 211 via the display 150 of the electronic device 212 the in-use SERP.

It should be apparent to those skilled in the art that at least some embodiments of the present technology aim to expand a range of technical solutions for addressing a particular technical problem, namely determining rank positions of non-native items by a ranking system.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining rank positions of non-native items by a ranking system, the ranking system having been trained to rank native items based on previous user interactions associated with native items, the non-native items being associated with limited previous user interactions and being non-rankable by the ranking system, the method executable on a server comprising a processor implementing the ranking system, the method comprising:

during a training phase of the ranking system:
acquiring, by the server, an indication of user interactions associated with a ranked list of items, items of the ranked list of items having been visually displayed on a training search engine results page (SERP) to a user of a training device in response to a training query having been received from the training device, the ranked list of items comprising native items and at least one non-native item, the native items having been ranked by the ranking system into a ranked list of native items, the at least one non-native item having been inserted into the ranked list of native items at a selected position thereby forming the ranked list of items,
each item in the ranked list of items being associated with a respective visual position on the training SERP such that the native items and the at least one non-native item are arranged in a visual 2-D arrangement having a plurality of vertically-arranged rows, the visual position of a given item being based on (i) the ranked list of items and (ii) SERP features of the training SERP, each row of the visual 2-D arrangement comprising at least two horizontally-arranged items from the ranked list of items;
generating, by the server, a respective usefulness score for each one of the at least one non-native item located at the respective visual position, the generating comprises, for a given one of the at least one non-native item:
analyzing, by the server, the user interactions associated with the given one of the at least one non-native item;

analyzing, by the server, the user interactions associated with items being horizontally-arranged after the given one of the at least one non-native item; and analyzing, by the server, the user interactions associated with items being vertically-arranged after the given one of the at least one non-native item;

training, by the server, the ranking system to predict a respective predicted usefulness score for an in-use non-native item for a respective rank position in a ranked list of in-use items in response to an in-use query, the ranking system being trained based on at least (i) the ranked list of items, (ii) the SERP features of the training SERP and (iii) the respective usefulness score of each one of the at least one non-native item; and during an in-use phase of the ranking system:

acquiring, by the server, the in-use query from an in-use device for visually displaying an in-use SERP associated with SERP features;

generating, by the server, a ranked list of in-use native items in response to the in-use query;

determining, by the server, an optimal rank position of the in-use non-native item in the ranked list of in-use items based on at least (i) the ranked list of in-use native items and (ii) the SERP features of the in-use SERP; and inserting, by the server, the in-use non-native item in the ranked list of in-use native items at the optimal ranked position thereby forming the ranked list of in-use items.

2. The method of claim 1, wherein the method further comprises triggering a visual display of the in-use items of the ranked list of in-use items on the in-use SERP to a user of the in-use device.

3. The method of claim 1, wherein the server hosts a computer-executed service and the ranking system is implemented by the computer-executed service, and wherein:

the native items are used items having been frequently used by users of the computer-executed service and the non-native items are fresh items having been insufficiently used by the users of the computer-executed service and thus being non-rankable by a native ranking algorithm of the ranking system.

4. The method of claim 3, wherein a given item is one of: an image-type item and a video-type item.

5. The method of claim 1, wherein the at least one non-native item comprises one of:

at least one non-native item randomly inserted in the ranked list of native items; and at least one non-native item inserted in the ranked list of native items according to a predetermined insertion pattern.

6. The method of claim 1, wherein the user interactions comprise at least one of:

a selection of a given item;

a long selection of the given item;

the selection of the given item followed by a web resource transition; and a hovering action over the given item.

7. The method of claim 1, wherein the SERP features of a given SERP comprise:

query features associated with the respective query;

a window size of a browser application displaying the given SERP; and a visual item size of each item in the respective ranked list of items.

8. The method of claim 7, wherein the query features of a given query comprise a recent submission frequency of the given query to the server as part of executing a search.

9. The method of claim 1, wherein the analyzing the user interactions associated with items being horizontally-arranged after the given one of the at least one non-native item comprises analyzing, by the server, the user interactions associated with an immediately next horizontally-arranged item located immediately after the given one of the at least one non-native item.

10. The method of claim 1, wherein the at least one non-native item comprises a visual group of non-native items that includes at least two immediately horizontally-arranged non-native items, the given one of the at least one non-native item being one of the at least two immediately horizontally-arranged non-native items, and wherein:

the analyzing the user interactions associated with the given one of the at least one non-native item comprises:

analyzing, by the server, user interactions associated with each one of the at least two immediately horizontally-arranged non-native items;

the analyzing the user interactions associated with items being horizontally-arranged after the given one of the at least one non-native item comprises:

analyzing, by the server, the user interactions associated with N immediately next horizontally-arranged items after the at least two immediately horizontally-arranged non-native items of the visual group of non-native items, N being equal to a number of items amongst the at least two immediately horizontally-arranged non-native items of the visual group of non-native items; and the analyzing the user interactions associated with items being vertically-arranged after the given one of the at least one non-native item comprises:

analyzing, by the server, user interactions associated with items being vertically-arranged after the at least two immediately horizontally-arranged non-native items of the visual group of non-native items.

11. The method of claim 1, wherein the analyzing the user interactions associated with items being vertically-arranged after the given one of the at least one non-native item comprises:

determining, by the server, a vertical proximity zone for the given one of the at least one non-native item based on the SERP features; and analyzing, by the server, user interactions associated with items being at least partially overlapped by the vertical proximity zone.

12. The method of claim 11, wherein the vertical proximity zone is defined:

(i) in a following row located immediately below a current row of the given one of the at least one non-native item; and (ii) between horizontal borders of the given one of the at least one non-native item; and wherein the analyzing the user interactions associated with items being vertically-arranged after the given one of the at least one non-native item comprises analyzing, by the server, user interactions associated with any item located in the following row and at least partially overlapped by the vertical proximity zone.

13. The method of claim 11, wherein the at least one non-native item comprises a visual group of non-native items including at least two immediately vertically-arranged non-native items located in immediately adjacent rows, the given one of the at least one non-native item being one of the at least two immediately vertically-arranged non-native items, and wherein:
the analyzing the user interactions associated with the given one of the at least one non-native item comprises: analyzing, by the server, user interactions associated with each one of the at least two immediately vertically-arranged non-native items; and
the vertical proximity zone is defined:
(i) in N following rows located immediately below a lowest row of the immediately adjacent rows; and
(ii) between horizontal borders of the visual group of non-native items; N being equal to a number of items amongst the at least two immediately vertically-arranged non-native items; and wherein
the analyzing the user interactions associated with items being vertically-arranged after the given one of the at least one non-native item comprises analyzing, by the server, user interactions associated with any item located in the N following rows and at least partially overlapped by the vertical proximity zone.

14. The method of claim 1, wherein:
the user interactions associated with the given one of the at least one non-native item are indicative of positive user interactions with the given one of the at least one non-native items; and
the user interactions associated with items that are horizontally-arranged after the given one of the at least one non-native item and the user interactions associated with items that are vertically-arranged after the given one of the at least one non-native item are indicative of negative user interactions with the given one of the at least one non-native items.

15. The method of claim 14, wherein the respective usefulness score is a weighted sum of the respective positive user interactions and of the respective negative user interactions.

16. The method of claim 14, wherein the generating the respective usefulness score comprises applying a surplus function, where a win is determined by the respective positive user interactions and a loss is determined by the respective negative user interactions.

17. The method of claim 1, wherein the SERP features of the training SERP comprise SERP-centric features of the training SERP and query features of the training query.

18. The method of claim 1, wherein the SERP features of the in-use SERP comprise in-use SERP-centric features of the in-use SERP and query features of the in-use query.

19. A method of training a ranking system to predict a usefulness score of a non-native item for a respective rank position in a ranked list of items in response to a query, the ranking system having been trained to rank native items based on previous user interactions associated with native items, the non-native items being associated with limited previous user interactions and being non-rankable by the ranking system, the method executable on a server comprising a processor implementing the ranking system, the method comprising:
acquiring, by the server, an indication of user interactions associated with a ranked list of items, items of the ranked list of items having been visually displayed on a training search engine results page (SERP) to a user of a training device in response to a training query having been received from the training device, the ranked list of items comprising native items and at least one non-native item, the native items having been ranked by the ranking system into a ranked list of native items, the at least one non-native item having been inserted into the ranked list of native items at a selected position thereby forming the ranked list of items,
each item in the ranked list of items being associated with a respective visual position on the training SERP such that the native items and the at least one non-native item are arranged in a visual 2-D arrangement having a plurality of vertically-arranged rows, the visual position of a given item being based on (i) the ranked list of items and (ii) SERP features of the training SERP, each row of the visual 2-D arrangement comprising at least two horizontally-arranged items from the ranked list of items;
generating, by the server, a respective usefulness score for each one of the at least one non-native item located at the respective visual position, the generating comprises, for a given one of the at least one non-native item:
analyzing, by the server, the user interactions associated with the given one of the at least one non-native item;
analyzing, by the server, the user interactions associated with items being horizontally-arranged after the given one of the at least one non-native item; and
analyzing, by the server, the user interactions associated with items being vertically-arranged after the given one of the at least one non-native item;
training, by the server, the ranking system to predict the respective usefulness score for an in-use non-native item for a respective rank position in a ranked list of in-use items in response to an in-use query, the ranking system being trained based on at least (i) the ranked list of items, (ii) the SERP features of the training SERP and (iii) the respective usefulness score of each one of the at least one non-native item.

20. A server for determining rank positions of non-native items by a ranking system, the ranking system having been trained to rank native items based on previous user interactions associated with native items, the non-native items being associated with limited previous user interactions and being non-rankable by the ranking system, the server comprising a processor implementing the ranking system and configured to:
during a training phase of the ranking system:
acquire an indication of user interactions associated with a ranked list of items, items of the ranked list of items having been visually displayed on a training search engine results page (SERP) to a user of a training device in response to a training query having been received from the training device, the ranked list of items comprising native items and at least one non-native item, the native items having been ranked by the ranking system into a ranked list of native items, the at least one non-native item having been inserted into the ranked list of native items at a selected position thereby forming the ranked list of items,
each item in the ranked list of items being associated with a respective visual position on the training SERP such that the native items and the at least one non-native item are arranged in a visual 2-D arrangement having a plurality of vertically-arranged rows, the visual position of a given item being based on (i) the ranked list of items and (ii) SERP features of the training SERP, each row of the visual 2-D arrangement comprising at least two horizontally-arranged items from the ranked list of items;

generate a respective usefulness score for each one of the at least one non-native item located at the respective visual position, the server configured to generate comprises the server being configured to, for a given one of the at least one non-native item:
  analyze the user interactions associated with the given one of the at least one non-native item;
  analyze the user interactions associated with items being horizontally-arranged after the given one of the at least one non-native item; and
  analyze the user interactions associated with items being vertically-arranged after the given one of the at least one non-native item;
train the ranking system to predict a respective predicted usefulness score for an in-use non-native item for a respective rank position in a ranked list of in-use items in response to an in-use query, the ranking system being trained based on at least (i) the ranked list of items, (ii) the SERP features of the training SERP and (iii) the respective usefulness score of each one of the at least one non-native item; and during an in-use phase of the ranking system:
  acquire the in-use query from an in-use device for visually displaying an in-use SERP associated with SERP features;
  generate a ranked list of in-use native items in response to the in-use query;
  determine an optimal rank position of the in-use non-native item in the ranked list of in-use items based on at least (i) the ranked list of in-use native items and (ii) the SERP features of the in-use SERP; and
  insert the in-use non-native item in the ranked list of in-use native items at the optimal ranked position thereby forming the ranked list of in-use items.

\* \* \* \* \*